US012021605B2

(12) United States Patent
Lakshminarayan et al.

(10) Patent No.: US 12,021,605 B2
(45) Date of Patent: *Jun. 25, 2024

(54) KEYPAD WITH REPEATER MODE

(71) Applicant: Ademco Inc., Golden Valley, MN (US)

(72) Inventors: Nagaraj Chickmagalur Lakshminarayan, Karnataka (IN); Kenneth Eskildsen, Great Neck, NY (US); Sachin Prakash Maganti, Karnataka (IN); Arun Handanakere Sheshagiri, Karnataka (IN); Anand Kavatekar Narayan Rao, Karnataka (IN)

(73) Assignee: Ademco Inc., Golden Valley, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/300,733

(22) Filed: Apr. 14, 2023

(65) Prior Publication Data

US 2023/0254035 A1 Aug. 10, 2023

Related U.S. Application Data

(63) Continuation of application No. 17/374,041, filed on Jul. 13, 2021, now Pat. No. 11,658,736.

(51) Int. Cl.
*H04B 7/212* (2006.01)
*H04W 84/18* (2009.01)
*H04W 88/04* (2009.01)

(52) U.S. Cl.
CPC ............ *H04B 7/212* (2013.01); *H04W 84/18* (2013.01); *H04W 88/04* (2013.01)

(58) Field of Classification Search
CPC ...... H04B 7/212; H04B 7/2643; H04B 10/29; H04W 76/27; H04W 88/04
See application file for complete search history.

(56) References Cited

U.S. PATENT DOCUMENTS

| 6,031,827 | A  | 2/2000  | Rikkinen et al. |
| 6,470,006 | B1 | 10/2002 | Moulsley |
| 6,690,657 | B1 | 2/2004  | Lau et al. |

(Continued)

FOREIGN PATENT DOCUMENTS

| CN | 103596191 A | 2/2014 |
| EP | 2757837 A1  | 7/2014 |

(Continued)

OTHER PUBLICATIONS

Mohamad Jaafer Ali, et al., "Efficient Medium Access Arbitration Among Interfering WBANs Using Latin Rectangles", ARXIV.org, Cornell University Library, Jan. 27, 2017, XP080752029, 18 pgs.

(Continued)

*Primary Examiner* — Alpus Hsu
(74) *Attorney, Agent, or Firm* — Greenberg Traurig, LLP; Nicholas Martin; David J. Dykeman

(57) ABSTRACT

A system includes a sensor device, a hub device, and a keypad device. The keypad device is configured to operate in a keypad mode and a wireless repeater mode. In the wireless repeater mode, the keypad device is in communication with the hub device and in direct communication with the sensor device such that the keypad device, in the wireless repeater mode, acts as a wireless repeater between the hub device and the sensor device.

20 Claims, 8 Drawing Sheets

(56) References Cited

U.S. PATENT DOCUMENTS

| | | |
|---|---|---|
| 7,593,422 B2 | 9/2009 | Shvodian |
| 8,228,859 B2 | 7/2012 | Wang et al. |
| 8,467,357 B2 | 6/2013 | Wang et al. |
| 8,884,774 B2 | 11/2014 | Sanderford, Jr. |
| 9,285,988 B2 | 3/2016 | Kenney et al. |
| 9,312,976 B2 | 4/2016 | Zhang |
| 9,565,657 B2 | 2/2017 | Suresh et al. |
| 9,736,703 B2 | 8/2017 | Goldsmith et al. |
| 9,814,038 B2 | 11/2017 | Suresh et al. |
| 9,872,146 B2 | 1/2018 | Mycek et al. |
| 9,913,232 B2 | 3/2018 | Seo et al. |
| 9,930,641 B2 | 3/2018 | Beema et al. |
| 9,978,237 B2 | 5/2018 | Britt et al. |
| 10,039,052 B2 | 7/2018 | Zhou et al. |
| 10,051,494 B2 | 8/2018 | Rengarajan et al. |
| 10,091,786 B2 | 10/2018 | Schmidl et al. |
| 10,129,916 B1 | 11/2018 | Lakshminarayan |
| 10,237,237 B2 | 3/2019 | Dawes et al. |
| 10,499,405 B2 | 12/2019 | Lee et al. |
| 10,656,830 B2 * | 5/2020 | Putko .................. G06F 40/53 |
| 10,798,539 B2 | 10/2020 | Marschalkowski et al. |
| 10,833,754 B2 | 11/2020 | Desclos et al. |
| 10,838,510 B2 * | 11/2020 | Tran ...................... G06F 9/452 |
| 10,913,094 B2 | 2/2021 | Li et al. |
| 11,184,322 B2 | 6/2021 | Dawes et al. |
| 11,329,842 B2 | 5/2022 | Akshminarayan et al. |
| 11,425,199 B2 | 8/2022 | Eskildsen et al. |
| 2003/0137993 A1 | 7/2003 | Odman |
| 2005/0058149 A1 | 3/2005 | Howe |
| 2006/0068820 A1 | 3/2006 | Sugaya et al. |
| 2007/0090996 A1 | 4/2007 | Wang |
| 2008/0032738 A1 | 2/2008 | Lemke et al. |
| 2008/0255636 A1 | 10/2008 | Delmain et al. |
| 2009/0103488 A1 | 4/2009 | Zhu et al. |
| 2011/0038356 A1 | 2/2011 | Bachrach |
| 2012/0044827 A1 | 2/2012 | In et al. |
| 2012/0166338 A1 | 6/2012 | Agnelli et al. |
| 2013/0320080 A1 | 12/2013 | Olson et al. |
| 2014/0324410 A1 | 10/2014 | Mathews et al. |
| 2014/0375428 A1 | 12/2014 | Park |
| 2015/0108901 A1 | 4/2015 | Greene et al. |
| 2015/0356332 A1 | 12/2015 | Turner et al. |
| 2016/0029346 A1 | 1/2016 | Suresh et al. |
| 2016/0044661 A1 | 2/2016 | Suresh |
| 2017/0055199 A1 | 2/2017 | Petersen et al. |
| 2017/0223615 A1 | 8/2017 | Lee et al. |
| 2017/0230810 A1 | 8/2017 | Banerjea |
| 2017/0273013 A1 | 9/2017 | Edara et al. |
| 2017/0332049 A1 | 11/2017 | Zhang |
| 2017/0359790 A1 | 12/2017 | Wang et al. |
| 2018/0041959 A1 | 2/2018 | Yang et al. |
| 2018/0098263 A1 | 4/2018 | Luo et al. |
| 2018/0242100 A1 | 8/2018 | Gandhi et al. |
| 2018/0242312 A1 | 8/2018 | Gandhi et al. |
| 2018/0279208 A1 | 9/2018 | Eskildsen et al. |
| 2018/0324607 A1 | 11/2018 | Rengarajan et al. |
| 2019/0132836 A1 | 5/2019 | Li et al. |
| 2019/0197838 A1 | 6/2019 | Beema et al. |
| 2019/0199578 A1 | 6/2019 | Lakshminarayan et al. |
| 2019/0250899 A1 | 8/2019 | Riedl et al. |
| 2019/0281371 A1 | 9/2019 | Klicpera |
| 2019/0281608 A1 | 9/2019 | Huang et al. |
| 2019/0380018 A1 | 12/2019 | Tian |
| 2020/0037252 A1 | 1/2020 | Chiarizio et al. |
| 2020/0068578 A1 | 2/2020 | Lee et al. |
| 2020/0267561 A1 | 8/2020 | Lakshminarayan et al. |
| 2020/0267738 A1 | 8/2020 | Barbu et al. |
| 2020/0296664 A1 | 9/2020 | Lakshminarayan et al. |
| 2021/0201486 A1 | 7/2021 | Takenouchi |
| 2021/0250197 A1 | 8/2021 | Lakshminarayan et al. |

FOREIGN PATENT DOCUMENTS

| | | |
|---|---|---|
| EP | 3506719 A1 | 7/2019 |
| EP | 3951732 A1 | 2/2022 |
| JP | 2000341751 A | 12/2000 |
| WO | 9819400 A1 | 5/1998 |
| WO | 2016160215 A1 | 10/2016 |
| WO | 2017143320 A1 | 8/2017 |
| WO | 2020096969 A1 | 5/2020 |
| WO | 2020195379 A1 | 10/2020 |

OTHER PUBLICATIONS

IEEE 802.11, Wikipedia, The free Encyclopedia, last edit Dec. 30, 2019, accessed on Feb. 4, 2019, 15 pgs.
International Search Report and Written Opinion of the International Application No. PCT/US2022/036377, dated Oct. 25, 2022, 15 pg.

* cited by examiner

KEYPAD WITH REPEATER MODE

RELATED APPLICATIONS

This application is a continuation of application Ser. No. 17/374,041, filed Jul. 13, 2021, the entire contents of which are incorporated herein by reference.

TECHNICAL FIELD

This disclosure relates generally to networks, for instance, networks used in home automation, comfort, and security systems. Embodiments disclosed herein include a keypad device that can be configured to operate in a repeater mode where the keypad device acts as a repeater between a hub device and one or more sensor devices.

BACKGROUND

A home network may use a wireless network protocol to connect devices within the home. For example, a hub device may use IEEE 802.15.4 to connect over one hundred sensor devices in a home to the hub device. The hub device may then collect sensor data collected by the sensor devices in the home. For instance, the hub device may collect door/window, or other security or home automation, sensor readings and output the door/window, or other security or home automation, sensor readings to a home security sensor or other device in the home network or, in some cases, to a remote server. In another instance, the hub device may collect temperature readings from multiple temperature sensors arranged within the home and output the temperature readings to a thermostat that controls an HVAC system using the temperature readings.

SUMMARY

In general, this disclosure relates to systems, devices, and methods for networks, such as networks used in home automation, comfort, and security systems.

A common issue in network systems, particularly wireless networks, can be that some devices in these network systems, such as sensor devices, can be located at the system premise at relatively far distances from a hub device. Depending on the distance from the hub device, this can make wireless communication between the hub device and the one or more relatively displaced sensor devices difficult. To improve the wireless communication ability between the one or more relatively displaced sensor devices and the hub device, a repeater can be used between the one or more relatively displaced sensor devices and the hub device to increase the range of communication. However, standalone repeaters can add to the costs associated with the smart home system, including increasing installation cost and increasing operating cost associated with the smart home system.

In accordance with the various examples set forth in this disclosure, a keypad device can be configured to selectively operate as a repeater between the hub device and one or more sensor devices. In this way, the keypad device can selectively operate in a wireless repeater mode in which the keypad device is in communication with the hub device and in direct wireless communication with the one or more sensor devices (e.g., using TDMA) such that the keypad device, in the wireless repeater mode, acts as a wireless repeater between the hub device and the sensor device.

This can be useful in extending the range of communication between the hub device and one or more relatively displaced sensor devices at the premise and, thereby, increasing the operational effectiveness and efficiency of the system. And, at the same time, this can help to reduce costs associated with the system, including reducing installation cost and/or reducing operating cost associated with the system, since the keypad device's ability to selectively operate in the wireless repeater mode can help to eliminate the need for a standalone repeater. Moreover, when the repeater functionality of the keypad device is not needed (e.g., because the one or more sensor devices can effectively communicate directly with the hub device), the keypad device can be configured to operate in a keypad mode in which the keypad device is in communication with the hub device but not in direct communication with the one or more sensor devices. As such, this can allow the keypad device to be configured to selectively operate in a mode suited for the particular system installation configuration and thereby provide the system with a tailored, increased ability to operate effectively in various, different premises. For instance, during installation of the keypad device, an installer can determine whether to activate the wireless repeater mode based on, for example, the installation location of the keypad device and/or one or more sensor devices relative to the hub device.

The keypad devices can communicate with the hub device and one or more sensor devices via one or more communication (e.g., wireless communication) protocols. For example, the keypad device can be configured to communicate with the hub device and one or more sensor devices via time-division duplexing, such as, for example, time-division multiple access (TDMA). As used herein, time-division duplexing can refer to processes that allocate each communication of multiple communications at a particular frequency (e.g., a 2.4 GHz band, a sub 1 GHz band) into a time "slot" of a repeating "superframe." In contrast, frequency-division multiplexing can assign each communication of multiple communications to a unique frequency. As another example, the keypad device can additionally be configured to communicate with the hub device and one or more sensor devices via a non-TDMA protocol.

One embodiment includes a system. This system embodiment includes a sensor device, a hub device, and a keypad device. The hub device is in communication with the sensor device using time divisional multiple access (TDMA) The keypad device is in communication with the hub device. The keypad device is configured to operate in: a keypad mode and a wireless repeater mode. In the keypad mode, the keypad device is in communication with the hub device but not in direct communication with the sensor device. In the wireless repeater mode, the keypad device is in communication with the hub device and in direct communication with the sensor device using TDMA such that the keypad device, in the wireless repeater mode, acts as a wireless repeater between the hub device and the sensor device.

In a further embodiment of this system, the keypad device is configured to operate in only one of the keypad mode and the wireless repeater mode at a given time.

In a further embodiment of this system, the keypad device is configured to operate in the wireless repeater mode in response to a user-provided wireless repeater mode input. For example, the hub device can be configured to receive the user-provided wireless repeater mode input, and the hub device can be configured, in response to receiving the user-provided wireless repeater mode input, to transmit a wireless repeater mode command signal to the keypad device. The keypad device can be configured, in response to receiving the wireless repeater mode command signal, to transition from the keypad mode to the wireless repeater mode.

In a further embodiment of this system, the keypad device includes a user interface, and the user interface is configured to display status information received from the hub device. For example, the user interface can be configured to receive a user-provided wireless repeater mode input, and the keypad device can be configured to operate in the wireless repeater mode in response to receiving the user-provided wireless repeater mode input at the user interface.

In a further embodiment of this system, the keypad device includes a TDMA wireless transceiver and a non-TDMA wireless transceiver. The TDMA wireless transceiver is configured to communicate with the hub device using TDMA and directly communicate with the sensor device using TDMA. The non-TDMA wireless transceiver is configured to communicate with the hub device using a non-TDMA protocol and directly communicate with the sensor device using the non-TDMA protocol. For example, the TDMA wireless transceiver can be activated when the keypad device is in the wireless repeater mode and deactivated when the keypad is in the keypad mode. And, the non-TDMA wireless transceiver can be activated when the keypad device is in the wireless repeater mode and deactivated when the keypad is in the keypad mode. The non-TDMA protocol can be selected from the group consisting of: a IEEE 802.11 protocol, a Bluetooth protocol, and a ZigBee protocol.

Another embodiment includes a keypad device. This keypad device embodiment includes a user interface and processing circuitry coupled to the user interface. The processing circuitry is configured to: operate the keypad device in a keypad mode in which the keypad device is in communication with a hub device but not in direct communication with a remote sensor device, and operate the keypad device in a wireless repeater mode in which the keypad device is in communication with the hub device and in direct communication with the remote sensor device using TDMA such that the keypad device, when operated in the wireless repeater mode, acts as a wireless repeater between the hub device and the remote sensor device.

In a further embodiment of this keypad device, the keypad device further includes a TDMA wireless transceiver and a non-TDMA wireless transceiver. The TDMA wireless transceiver is coupled to the processing circuitry. When the processing circuitry operates the keypad device in the wireless repeater mode, the keypad device is configured to communicate with the hub device via the TDMA wireless transceiver using TDMA and is configured to directly communicate with the remote sensor device via the TDMA wireless transceiver using TDMA. The non-TDMA wireless transceiver is coupled to the processing circuitry. When the processing circuitry operates the keypad device in the keypad mode, the keypad device is configured to communicate with the hub device via the non-TDMA wireless transceiver using a non-TDMA protocol and is configured to directly communicate with the remote sensor device via the non-TDMA wireless transceiver using the non-TDMA protocol. For example, the processing circuitry can be configured to activate the TDMA wireless transceiver when the processing circuitry operates the keypad device in the wireless repeater mode and deactivate the TDMA wireless transceiver when the processing circuitry operates in the keypad mode. Similarly, as another example, the processing circuitry can be configured to activate the non-TDMA wireless transceiver when the processing circuitry operates the keypad device in the wireless repeater mode and deactivate the non-TDMA wireless transceiver when the processing circuitry operates the keypad device in the keypad mode. The non-TDMA protocol can be selected from the group consisting of: a IEEE 802.11 protocol, a Bluetooth protocol, and a ZigBee protocol.

In a further embodiment of this keypad device, the processing circuitry is configured to operate the keypad device in only of the keypad mode and the wireless repeater mode at a given time.

In a further embodiment of this keypad device, the processing circuitry is configured to operate the keypad device in the wireless repeater mode in response to the keypad device receiving a user-provided wireless repeater mode input at the user interface of the keypad device.

In a further embodiment of this keypad device, the processing circuitry is configured to operate the keypad device in the wireless repeater mode in response to the keypad device receiving a user-provided wireless repeater mode input from the hub device. For example, the processing circuitry can be configured to transition the keypad device from operation in the keypad mode to operation in the wireless repeater mode in response to the keypad device receiving the user-provided wireless repeater mode input from the hub device.

In a further embodiment of this keypad device, the keypad device further includes a wireless repeater module. The wireless repeater module is coupled to the processing circuitry. The wireless repeater module includes a TDMA wireless transceiver. The processing circuitry is configured to operate the keypad device in the wireless repeater mode via the wireless repeater module by communicating with the hub device via the TDMA wireless transceiver using TDMA and communicating directly with the remote sensor device via the TDMA wireless transceiver using TDMA.

An additional embodiment includes a method. This method embodiment includes the step of receiving a user-provided wireless repeater mode input at a keypad device. This method embodiment also includes the step of, in response to the keypad device receiving the user-provided wireless repeater mode input, transitioning the keypad device between a keypad mode, in which the keypad device is in communication with a hub device but not in direct communication with a remote sensor device, and a wireless repeater mode, in which the keypad device is in communication with the hub device and in direct communication with the remote sensor device using TDMA such that the keypad device, in the wireless repeater mode, acts as a wireless repeater between the hub device and the remote sensor device. This method embodiment additionally includes the step of, when the keypad device is in the wireless repeater mode, receiving, at the keypad device, a TDMA message from the hub device and conveying the TDMA message from the keypad device to the remote sensor device.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The following drawings are illustrative of particular examples of the present invention and therefore do not limit the scope of the invention. The drawings are not necessarily to scale, though embodiments can include the scale illustrated, and are intended for use in conjunction with the explanations in the following detailed description wherein like reference characters denote like elements. Examples of the present invention will hereinafter be described in conjunction with the appended drawings.

DETAILED DESCRIPTION

Figure 1:
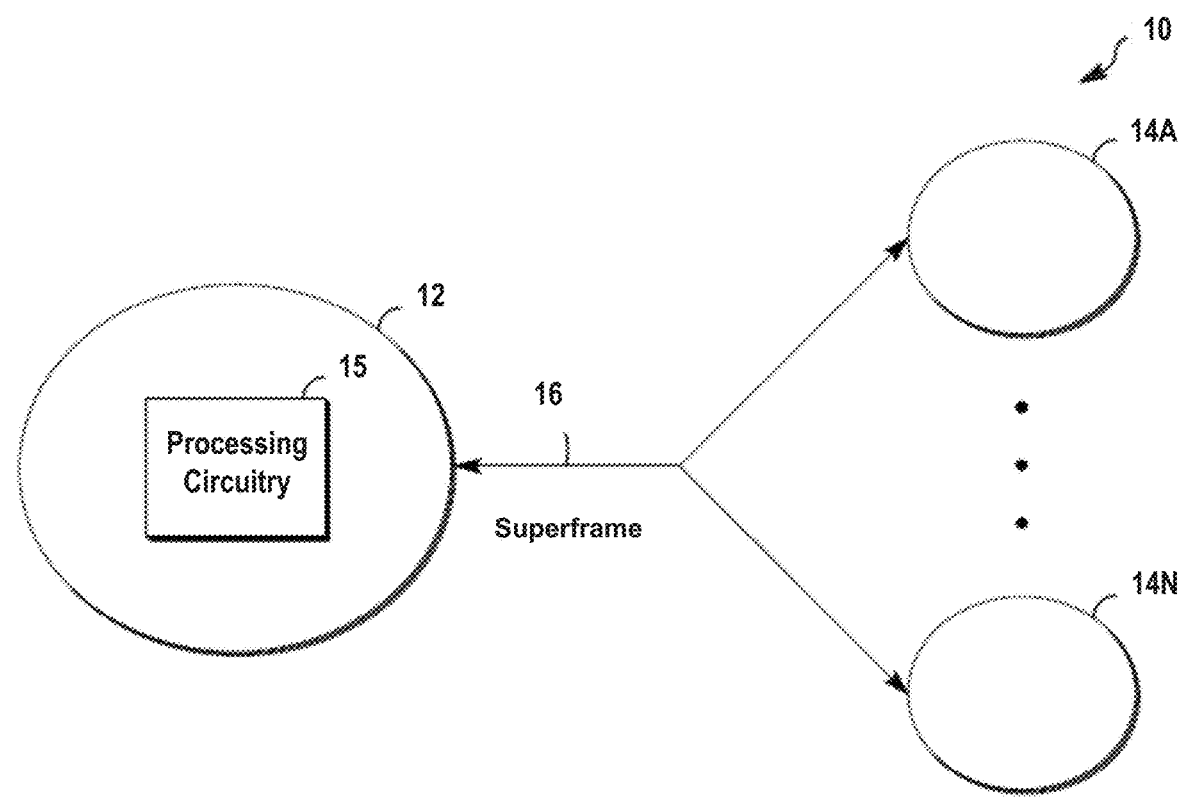
FIG. 1 is a conceptual diagram illustrating devices in communication using a superframe, in accordance with some examples of this disclosure.

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Modern residential buildings or other buildings may include a central "hub" device configured to manage one or more systems within the building, such as monitoring systems, comfort systems, security systems, and/or home automation systems. The hub device can be in wireless communication with a number of other devices placed throughout the building. For example, the hub device may wirelessly receive sensor data from any number of different sensor devices, such as motion sensors, air quality and/or temperature sensors, infrared sensors, door and/or window contact sensors, switches, and/or other sensor devices. As a further example, the hub device can be in communication with a keypad device such that the hub device can transmit data to the keypad device and receive data from the keypad device (e.g., a system arm command, a system disarm command, etc). Additionally, the hub device may wirelessly transmit commands or instructions to one or more controllable sensor devices. For example, the hub device may instruct a thermostat to adjust a temperature within the building, or in another example, may command one or more sensor devices to take a specified action, for instance, based on a command received from the keypad device.

In some applications for managing one or more systems within a building, BLUETOOTH radio communication techniques may have an advantage over other radio connection techniques such as, for example, IEEE 802.15.4 radio communication techniques. For instance, BLUETOOTH radio communications techniques may support high data rates and throughput compared to IEEE 802.15.4 radio communication techniques. For example, BLUETOOTH may have a bandwidth of greater than 500 kilobits-per-second (kbps) (e.g., 1 Mbps) and IEEE 802.15.4 may have a bandwidth of less than 500 kbps (e.g., 250 kbps). From a range perspective, BLUETOOTH radio techniques and IEEE 802.15.4 radio communication techniques may have nearly equal link budget. BLUETOOTH may have a range of greater than 80 meters (e.g., 100 meters) and IEEE 802.15.4 may have a range of less than 80 meters (e.g., 70 meters). In some examples, BLUETOOTH may have a join time (e.g., latency) of greater than 1 second (e.g., 3 seconds) and IEEE 802.15.4 may have a join time of less than 1 second (e.g., 30 milliseconds (ms)). BLUETOOTH may have a stack size of greater than 100 kb (e.g., 250 kb) and IEEE 802.15.4 may have a stack size of less than 100 kb (e.g., 28 ms). In some examples, IEEE 802.11, also referred to herein as simply "Wi-Fi™," may offer even higher data rates than BLUETOOTH but with a higher energy cost.

As used herein, BLUETOOTH may refer to present and future versions of BLUETOOTH. Examples of BLUETOOTH include classic BLUETOOTH (e.g., Versions 1.0, 1.0B, 1.1, 1.2, 2.0, 2.1, 3.0, 4.0, 4.1, 4.2, 5, 5.1, etc.), BLUETOOTH-low energy (e.g., Versions 4.0, 4.1, 4.2, 5, 5.1, etc.), and other types of BLUETOOTH. As such, all instances of "BLUETOOTH" herein should be interpreted as including classic BLUETOOTH and/or BLUETOOTH-low energy. BLUETOOTH may operate at frequencies between 2.402 and 2.480 GHz, 2.400 and 2.4835 GHz including a 2 MHz wide guard band and a 3.5 MHz wide guard band, or another frequency range. In some examples, each frequency channel of the BLUETOOTH channel may have a center frequency different from a central frequency of a neighboring channel by less than 1 MHz. In some examples, each frequency channel of a wireless channel (e.g., an IEEE 802.15.4 channel) may have a center frequency different from a central frequency of a neighboring channel by greater than 1 MHz (e.g., 2 MHz, 5 MHz, etc.).

In some cases, BLUETOOTH can refer to communications that use frequency hopping, such as, for example, frequency-hopping spread spectrum, to avoid interference from other radio communications. For example, a device using a BLUETOOTH channel may operate a BLUETOOTH channel that hops between 37 frequency channels when using advertising channels and 40 frequency channels when operating without advertising channels. In contrast, IEEE 802.15.4 may instead use a direct sequence spread spectrum technique. For example, a device may establish a wireless channel using IEEE 802.15.4 by mixing a signal for the wireless channel with a pseudo-random code which is then extracted by a receiver from an external device. Direct sequence spread spectrum may help to enhance the signal-to-noise ratio by spreading the transmitted signal across a wide band. In some examples, a device establishing a wireless channel using IEEE 802.15.4 may be configured to scan for a clear spectrum.

Smart home devices may deploy many different wireless protocols to address the needs of the smart home. There are standards-based protocols (Wi-Fi™, Zigbee™ Thread™, Zwave™, BLUETOOTH, DECT™, etc.) and proprietary, manufacturer specific protocols. The issue with this array of protocols is that each protocol is tuned to a specific application. For example, Wi-Fi™ may be particularly useful for high bandwidth data applications that do not require long battery life. Zigbee™ may be particularly useful for low bandwidth data applications to maximize battery life. Additionally, not every wireless protocol is globally compliant. For example, Zwave™ may have different hardware designs for various operational regions.

Smart home systems may include a collection of different networks that operate at a common frequency suitable for home networks. For example, a Wi-Fi™ network of a smart home system, a BLUETOOTH network of the smart home system, and an IEEE 802.15.4 network of the smart home system may each operate at a 2.4 GHz frequency. A hub device may allocate each device to a time slot, also referred to herein as simply "slot," of the superframe (e.g., during a registration process). For example, the hub device may allocate a Wi-Fi™ slot to one or more first devices, a BLUETOOTH slot to one or more second devices, and an IEEE 802.15.4 slot to one or more third devices. In this example, the hub device may output the superframe using a beacon that specifies a beginning of the superframe. All devices of the network may synchronize to the beacon and output data at the 2.4 GHz frequency according to the allocated slots (e.g., relative to the beacon) of the superframe. For instance, the one or more first devices output data in accordance with the Wi-Fi™ protocol during the Wi-Fi™ slot, the one or more second devices output data in accordance with the BLUETOOTH protocol during the BLUETOOTH slot, and the one or more third devices output data in accordance with the IEEE 802.15.4 protocol during the 802.15.4 slot.

When smart home systems operate over any of these network types, a common issue in typical systems is that some devices in these systems, such as sensor devices, can be located at the system premise at relatively far distances from the hub device. Depending on the distance from the hub device, this can make communication between the hub device and the one or more relatively displaced sensor devices difficult. To improve the communication ability between the one or more relatively displaced sensor devices and the hub device, a repeater can be used between the one or more relatively displaced sensor devices and the hub device to increase the range of communication. However, standalone repeaters can add to the costs associated with the smart home system, including increasing installation cost and increasing operating cost associated with the smart home system.

In accordance with the various examples set forth in this disclosure, a keypad device can be configured to selectively operate as a repeater between the hub device and one or more sensor devices. In this way, the keypad device can selectively operate in a wireless repeater mode in which the keypad device is in communication with the hub device and in direct communication with the one or more sensor devices (e.g., using TDMA) such that the keypad device, in the wireless repeater mode, acts as a wireless repeater between the hub device and the sensor device. This can be useful in extending the range of communication between the hub device and one or more relatively displaced sensor devices at the premise and, thereby, increasing the operational effectiveness and efficiency of the system. And, at the same time, this can help to reduce costs associated with the system, including reducing installation cost and/or reducing operating cost associated with the system, since the keypad device's ability to selectively operate in the wireless repeater mode can help to eliminate the need for a standalone repeater. Moreover, when the repeater functionality of the keypad device is not needed (e.g., because the one or more sensor devices can effectively communicate directly with the hub device), the keypad device can be configured to operate in a keypad mode in which the keypad device is in communication with the hub device but not in direct communication with the one or more sensor devices. As such, this can allow the keypad device to be configured to selectively operate in a mode suited for the particular system installation configuration and thereby provide the system with an increased ability to operate effectively in various, different premises.

FIG. 1 is a conceptual diagram illustrating a system 10 with devices in communication using a superframe, in accordance with some examples of this disclosure. In some examples, the superframe is a time divisional multiple access (TDMA) superframe. While system 10 illustrates only hub device 12 and sensor devices 14A-14N (collectively, "sensor devices 14" or simply "devices 14"), system 10 may include additional devices (e.g., devices in wireless communication with each other) or fewer devices. System 10 may be installed within a building and the surrounding premises (collectively, "premise").

Hub device 12 may include a computing device configured to operate one or more systems within a building, such as comfort, security, safety, and/or home automation systems. For example, as described further below, hub device 12 may include processing circuitry 15 configured to receive data, such as data received from one or more devices and/or from user input, and process the data in order to automate one or more systems within a building. For example, hub device 12 may automate, control, or otherwise manage systems including heating and cooling, ventilation, illumination, and/or security (e.g., authorized access to individual rooms or other regions), as non-limiting examples. For example, hub device 12 may include a "Life and Property Safety Hub®" of Resideo Technologies, Inc. ®, of Austin, Texas. Hub device 12 may include a wired connection to an electric power grid, but in some examples may include an internal power source, such as a battery, supercapacitor, or another internal power source.

Sensor devices 14 may be configured to enroll with hub device 12. For example, sensor device 14 may be configured to exchange sensor data with hub device 12 and/or be controlled by hub device 12. Sensor devices 14 may be configured to collect or generate sensor data and transmit the sensor data to hub device 12 for processing. In some examples, sensor device 14 may include a controllable device. A controllable device may be configured to perform a specified function when the controllable device receives instructions (e.g., a command or other programming) to perform the function from hub device 12. Examples of different types of sensor devices 14 are included in reference to FIG. 2. Sensor devices 14 may include either a wired connection to an electric power grid or an internal power source, such as a battery, supercapacitor, or another internal power source.

Processing circuitry 15 may be configured to communicate with sensor devices 14 using one or more wireless communication protocols and one or more frequency bands (e.g., two different frequency bands). Examples of wireless communication protocols may include, but not limited to, a low-power wireless connection protocol, a high-bandwidth connection protocol, or a local area networking protocol. Examples of a low-power connection protocol may include, but are not limited to, IEEE 802.15.4, a low power protocol using a 900 MHz frequency band, or another low-power connection protocol. As used herein, IEEE 802.15.4 may include any standard or specification compliant with IEEE 802.15.4, such, as for example, Zigbee™, ISA100.11a™ WirelessHART™, MiWi™, 6LoWPAN™, Thread™, SNAP™, and other standards or specifications that are compliant with IEEE 802.15.4. That is, for example, IEEE 802.15.4 should be interpreted herein as including implementations relying only on the IEEE 802.15.4 standard as well as implementations that build upon the IEEE 802.15.4 standard with additional specifications, such as, for example, Zigbee™. Examples of a high-bandwidth connection protocol may include, for example, BLUETOOTH (e.g., classic BLUETOOTH, BLUETOOTH low energy, etc.). Examples of a local area networking protocol may include, for example, Wi-Fi™ (e.g., IEEE 802.11 a/b/g/n/ac, etc.).

Although FIG. 1 shows hub device 12 as directly connected to sensor devices 14, in some examples, system 10 may include a repeater module (e.g., included at a keypad device as described elsewhere herein) that is configured to act as an intermediary or "repeater" device. For example, sensor device 14A may output first data in accordance with Wi-Fi™ to the repeater module, which outputs the first data to hub device 12. In this example, sensor device 14B may output second data in accordance with BLUETOOTH to the repeater module, which outputs the second data to hub device 12. While in the noted example the repeater module is the same device (e.g., a device configured to communicate in accordance with BLUETOOTH and in accordance with Wi-Fi™), in other examples two or more repeater modules may be included in system 10 as separate devices (e.g., repeater modules included at separate keypad devices as described elsewhere herein).

Processing circuitry 15 may be configured to use TDMA for communication in system 10. For example, a Wi-Fi™ network of a smart home system, a BLUETOOTH network of the smart home system, and an IEEE 802.15.4 network of the smart home system may operate at a 2.4 GHz frequency (e.g., within a band of frequencies comprising 2.4 GHz). In this example, processing circuitry 15 may register each of devices 14 to a slot of a superframe. For example, processing circuitry 15 may allocate sensor device 14A to a first slot of a superframe 16, also referred to herein as simply "superframe 16," for a group of devices and allocate sensor device 14N to a second slot of superframe 16 for a group of devices. Processing circuitry 15 may "output" superframe 16 by outputting a beacon signaling the beginning of the superframe. Each one of sensor devices 14 may synchronize with the beacon and output data according to the slots defined by the superframe. In some examples, processing circuitry 15 may periodically output superframe 16 to allow sensor devices 14 to output data.

Hub device 12 may allocate multiple devices to a single slot of a superframe, but possibly at different portions of the single slot. For example, hub device 12 may allocate sensor device 14A to a first 4 ms portion of an IEEE 802.15.4 slot and allocate sensor device 14N to a second 4 ms portion of the IEEE 802.15.4 slot that is different from the first 4 ms portion of the IEEE 802.15.4 slot. In some examples, hub device 12 may allocate sensor device 14A to a first channel (e.g., 2.402 GHz) of a BLUETOOTH slot and allocate sensor device 14N to a second channel (e.g., 2.479 GHz) of the BLUETOOTH slot that is different from the first channel.

Processing circuitry 15 may use multiple superframes and/or a single superframe with slots allocated to device communication at different frequency bands. For example, processing circuitry 15 may allocate sensor device 14A to a slot of a first superframe for a first group of devices and allocate sensor device 14N to a slot of a second superframe for a second group of devices. Processing circuitry 15 may output the first superframe by outputting a first beacon signaling the beginning of the first superframe. In response to the first beacon, sensor device 14A may output data according to the slots defined by the first superframe while sensor device 14N refrains from outputting data during the first superframe. In this example, processing circuitry can output the second superframe by outputting a second beacon signaling the beginning of the second superframe. In response to the second superframe, sensor device 14A may refrain from outputting data and sensor device 14B may output data according to the slots defined by the second superframe. Processing circuitry 15 may periodically output the first superframe and the second superframe to allow sensor devices 14 to output data.

In accordance with the techniques of the disclosure, processing circuitry 15 may output superframe 16 as a regular superframe according to a typical schedule. For instance, processing circuitry may be configured to output a superframe with a particular period between each superframe, that period ranging from as little as 5 ms between superframes, as much as 1 second or more between superframes, or in the middle at around 245 ms between superframes. In some examples, so long as processing circuitry 15 does not detect any noise that would interfere with the output of the regular superframe, processing circuitry 15 can maintain that schedule of outputting superframes periodically. In other words, in such examples, hub device 12 may attempt to drift the periodic beacon either in a positive (e.g., delaying the output of the beacon) or negative (e.g., outputting the beacon sooner than planned) direction depending on certain circumstances. One such circumstance is a time at which a greater number of non-TDMA messages are received, with those non-TDMA messages coming from either a same sensor device or different sensor devices. Another circumstance where hub device 12 may attempt to drift the periodic beacon is if a certain number of sensor devices 14 are sending non-TDMA at almost at a same time. This may be an indication that these sensor devices are facing a common or same interference, potentially by being near the interference source.

Additionally, every sensor device may have a unique short address, depending on the time at which the sensor device will be reporting. Alarms and messages during a TDMA slot can be fixed, so by using the short address, hub device 12 can calculate the slot at which the particular sensor is sending the TDMA message. Depending on the slot, hub device 12 can shift beacon by considering the short address of the sensor device, the signal strength of the packet received from the sensor device at hub device 12, and/or a time at which the sensor device is sending a packet.

In examples within the scope of this disclosure, processing circuitry 15 may detect noise over the network that interferes with the scheduled transmission of a regular superframe, e.g., initial superframe 16, to sensor devices 14A-14N. If processing circuitry 15 determines that there is signal interference, processing circuitry may adjust the schedule such that processing circuitry 15 outputs a time-shifted superframe either prior to or after the initially scheduled time. If processing circuitry 15 were to continue outputting the regularly scheduled superframes despite the noise, each of sensor devices 14A-14N could perform lengthy and battery-intensive rejoin scans to re-connect with hub device 12. Rather, by outputting the time-shifted superframe to avoid the noise on the network, hub device 12 can maintain the operational and communicational efficiency of system 10 and efficiently utilize the batteries of each of sensors 14A-14N.

Figure 2A:
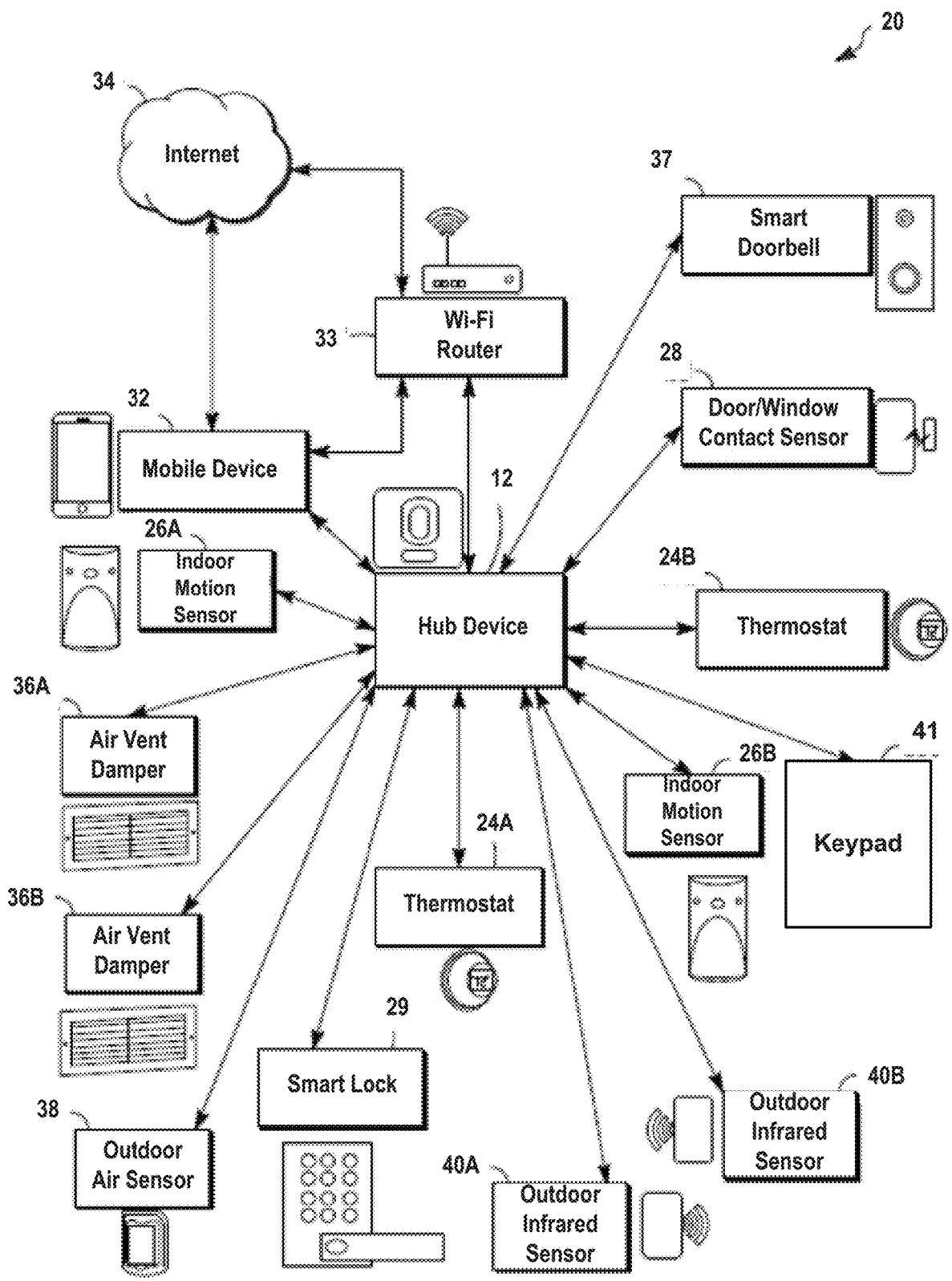
FIG. 2A is a conceptual block diagram illustrating an example of a home network, in accordance with some examples of this disclosure.

FIG. 2A is a conceptual block diagram illustrating a networked system 20, which may be one example of the networked system 10 of FIG. 1, in accordance with some examples of this disclosure. Exemplary system 20 includes hub device 12, thermostat 24A, thermostat 24B (collectively, thermostats 24), indoor motion sensor 26A, outdoor motion sensor 26B (collectively, motion sensors 26), door/window contact sensor 28, air vent damper 36A, 36B (collectively, air vent dampers 36), smart doorbell 37, outdoor air sensor 38, outdoor infrared sensor 40A, indoor infrared sensor 40B (collectively, infrared sensors 40), keypad device 41, router 33, and mobile device 32. Hub device 12 and one or more of the devices in the networked system 20 can communicate using a first frequency band (e.g., 2.4 GHz) and/or a second, different frequency band (e.g., sub 1 GHz). For example, at least one device in the networked system 20 can communicate with hub device 12 using the first frequency band while at least one other device in the networked system 20 can communicate with hub device 12 using the second, different frequency band. In another example, at least one device in the networked system 20 can selectively communication with hub device 12 using one of the first frequency band and the second, different frequency band as selected for a specific superframe. While hub device 12 is shown as a distinct component, hub device 12 could be integrated into one or more of thermostats 24, motion sensors 26, door/window contact sensor 28, air vent dampers 36, smart doorbell 37, outdoor air sensor 38, infrared sensors 40, and/or keypad device 41. The various devices of system 20 are for example purposes only. For example, additional devices may be added to system 20 and/or one or more devices of system 20 may be omitted.

The system 20 is a non-limiting example of the techniques of this disclosure. Other example systems may include more, fewer, or different components and/or devices. While FIG. 2A illustrates a mobile phone, mobile device 32 may, in some examples, include a tablet computer, a laptop or personal computer, a smart watch, a wireless network-enabled key fob, an e-readers, or another mobile device. Mobile device 32 and/or router 33 may be connected to a wide area network, such as, for example, internet 34. Internet 34 may represent a connection to the Internet via any suitable interface, such as, for example, a digital subscriber line (DSL), dial-up access, cable internet access, fiber-optic access, wireless broadband access, hybrid access networks, or other interfaces. Examples of wireless broadband access may include, for example, satellite access, WiMax™, cellular (e.g., 1×, 2G, 3G™, 4G™, 5G™, etc.), or another wireless broadband access.

Hub device 12 may be in wireless data communication with thermostats 24, motion sensors 26, door/window contact sensor 28, air vent dampers 36, smart doorbell 37, outdoor air sensor 38, infrared sensors 40, and keypad device 41. For example, thermostats 24, motion sensors 26, door/window contact sensor 28, air vent dampers 36, smart doorbell 37, outdoor air sensor 38, infrared sensors 40, and keypad device 41 can be directly connected to hub device 12 using one or more wireless channels according to a connection protocol, such as, but not limited to, for example, IEEE 802.15.4, BLUETOOTH, or another connection protocol.

Each of thermostats 24, motion sensors 26, door/window contact sensor 28, air vent dampers 36, smart doorbell 37, outdoor air sensor 38, infrared sensors 40, and keypad device 41 may include either a sensor device (e.g., a device configured to collect and/or generate sensor data), a controllable device, or both, as described herein. For example, thermostats 24 may include comfort devices having sensors, such as a thermometer configured to measure an air temperature. In some examples, air vent dampers 36 may include devices located within an air vent or air duct, configured to either open or close the shutters of an air vent in response to receiving instructions from hub device 12. Keypad device 41 can include a user interface configured to receive user input thereat to facilitate control over one or more aspects of system 20 (e.g., arming or disarming security devices of system 20).

FIG. 2A shows the keypad device 41 in an exemplary keypad mode. In the keypad mode, the keypad device 41 can be in communication (e.g., data communication) with the hub device 12 but not in direct communication with one or more particular sensor devices 14. Although not shown in the example of FIG. 2A, as will be described further herein, the keypad device can selectively transition to a repeater mode. In the repeater mode, the keypad device 41 can be in communication (e.g., data communication) with hub device 12 and in direct communication (e.g., data communication) with the one or more particular sensor devices 14 which the keypad device 41 is not in direct communication with when in the keypad mode such that the keypad device 41, in the repeater mode, acts as a repeater between the hub device 12 and the one or more particular sensor devices 14. For example, the keypad device 41 can be in communication with the hub device 12 and in direct communication with the one or more particular sensor devices 14 using TDMA. Thus, when the keypad device 41 is in the repeater mode, hub device 12 can be in indirect wireless data communication (e.g., communication via activated repeater module at the keypad device 41) with the one or more particular sensor devices 14, such as one or more of thermostats 24, motion sensors 26, door/window contact sensor 28, air vent dampers 36, smart doorbell 37, outdoor air sensor 38, and infrared sensors 40. The following provides some examples of communication that can be directly communicated to hub device 12 (e.g., when keypad device 41 is in the keypad mode) or indirectly communicated to hub device 12 via a repeater module (e.g., via a repeater module of the keypad device 41 when the keypad device 41 is in the repeater mode).

Thermostats 24 may be configured to wirelessly transmit the temperature (e.g., sensor data) directly to hub device 12. Additionally, thermostats 24 may include controllable devices, in that they may activate or deactivate a heating, cooling, or ventilation system in response to receiving instructions from hub device 12. For example, thermostat 24A may collect temperature data and transmit the data to hub device 12 (directly or indirectly). Hub device 12, in response to receiving the temperature data, may determine that a respective room is either too hot or too cold based on the temperature data, and transmit a command to thermostat 24A (directly or indirectly) to activate a heating or cooling system as appropriate. In this example, each of thermostats 24 may include both sensor devices and controllable devices within a single distinct unit.

Indoor and outdoor motion sensors 26 may include security devices configured to detect the presence of a nearby mobile object based on detecting a signal, such as an electromagnetic signal, an acoustic signal, a magnetic signal, a vibration, or other signal. In response to detecting the respective signal, motion sensors 26 may generate sensor data indicating the presence of an object, and wirelessly transmit the sensor data to hub device 12 (directly or indirectly). Hub device 12 may be configured to perform an action in response to receiving the sensor data, such as outputting an alert, such as a notification to mobile device 32, or by outputting a command for the respective motion sensor 26 (directly or indirectly) to output an audible or visual alert. In this example, each of motion sensors 26 may include both sensor devices and controllable devices within a single unit.

Door and/or window contact sensor 28 may include a security device configured to detect the opening of a door or window on which the door and/or window contact sensor 28 is installed. For example, contact sensor 28 may include a first component installed on a door or window, and a second component installed on a frame of the respective door or window. When the first component moves toward, past, or away from the second component, the contact sensor 28 may be configured to generate sensor data indicating the motion of the door or window, and wirelessly transmit the sensor data to hub device 12 (directly or indirectly). In response to receiving the sensor data, hub device may be configured to perform an action such as outputting an alert, such as a notification to mobile device 32, or by outputting a command for the respective contact sensor 28 (directly or indirectly) to output an audible or visual alert. In this example, contact sensor 28 may include a sensor devices and a controllable devices within a single unit.

Air vent dampers 36 may be configured to regulate a flow of air inside of a duct. For example, thermostats 24 may generate a control signal to close air vent damper 36A (e.g., when the room is not occupied). In this example, in response to the control signal, air vent damper 36 may close to prevent air from flowing from air vent damper 36A. In some examples, air vent dampers 36 may send sensor data indicating a state (e.g., open or closed) of the respective air vent damper. For instance, air vent damper 36 may output, to thermostats 24 an indication that air vent damper 36 is in an open state.

Smart doorbell 37 may be configured to provide notifications to hub device 12 (directly or indirectly). For example, smart doorbell 37 may be configured to provide a notification (e.g., message) when a button (e.g., doorbell) of smart doorbell 37 is activated. In some examples, smart doorbell 37 may include motion sensor circuitry configured to generate a notification in response to motion detected near smart doorbell 37. In some examples, smart doorbell 37 may be configured to generate video content in response to motion detected near smart doorbell 37. In some examples, smart doorbell 37 may be configured to generate audio content in response to motion detected near smart doorbell 37. For instance, in response to motion detected near smart doorbell 37, smart doorbell 37 may generate video content using a camera and/or audio content using a microphone. In this instance, smart doorbell 37 may output the video content and audio content to hub device 12, which may forward the video content and/or audio content to mobile device 32.

Outdoor air sensor 38 may be configured to generate sensor data indicating, for example, a temperature, humidity, and/or quality (e.g., carbon monoxide, particulate matter, or other hazards) of the surrounding air. In some examples, outdoor air sensor 38 may wireless transmit the sensor data to hub device 12 (directly or indirectly). For instance, outdoor air sensor 38 may periodically output a current or average temperature to thermostats 24 via hub device 12.

Outdoor passive infrared sensors 40 may include security devices configured to detect the presence of a nearby object, such as a person, based on detecting infrared wavelength electromagnetic waves emitted by the object. In response to detecting the infrared waves, passive infrared sensors 40 may generate sensor data indicating the presence of the object, and wirelessly transmit the sensor data to hub device 12 (directly or indirectly). Hub device 12 may be configured to perform an action in response to receiving the sensor data, such as outputting an alert, such as a notification to mobile device 32, or by outputting (directly or indirectly) a command for the respective passive infrared sensor 40 to output an audible or visual alert.

System 20 may include various devices, including, for example, a security device, a water heater, a water flow controller, a garage door controller, or other devices. For example, system 20 may include one or more of: a door contact sensor, a motion passive infrared (PIR) sensor, a mini contact sensor, a key fob, a smoke detector, a glass break detector, a siren, a combined smoke detector and Carbon monoxide (CO) detector, an indoor siren, a flood sensor, a shock sensor, an outdoor siren, a CO detector, a wearable medical pendant, a wearable panic device, an occupancy sensor, and/or other devices.

In accordance with the techniques of the disclosure, hub device 12 and each of thermostats 24, motion sensors 26, door/window contact sensor 28, air vent dampers 36, smart doorbell 37, outdoor air sensor 38, infrared sensors 40, and/or keypad 41 can be configured to operate using a superframe. In some examples, initially, hub device 12 may be configured to output a superframe to each of thermostats 24, motion sensors 26, door/window contact sensor 28, air vent dampers 36, smart doorbell 37, outdoor air sensor 38, infrared sensors 40, and/or keypad 41 according to a regular, pre-defined, periodic schedule. As the various devices in system 20 operate and transmit TDMA messages and superframes, additional devices outside of system 20, such as a laptop or a mobile phone, may join the network, creating noise over the network that could interfere with the periodic transmission of superframes by hub device 12. For the ones of thermostats 24, motion sensors 26, door/window contact sensor 28, air vent dampers 36, smart doorbell 37, outdoor air sensor 38, infrared sensors 40, and keypad 41 that no longer receive the periodic superframes due to the additional noise, those sensor devices would initiate rejoin scans and/or output any messages that need to be sent to hub device 12 using a non-TDMA protocol.

For instance, if the noise causes smart doorbell 37 to no longer receive the superframes from hub device 12 (directly or indirectly), smart doorbell 37 may either try to rejoin and reconnect with hub device 12 through retry signals, or may send messages to hub device 12 under a non-TDMA protocol (directly or indirectly). For instance, smart doorbell 37 may output an indication that video content will be sent to hub device 12 and send that video content under a non-TDMA signal. In response to hub device receiving the non-TDMA signal, hub device 12 may determine that there must be signal interference in the network. As such, hub device 12 can output a next superframe as a time-shifted superframe instead of the regularly scheduled superframe, thereby avoiding the noise introduced into the network.

Figure 2B:
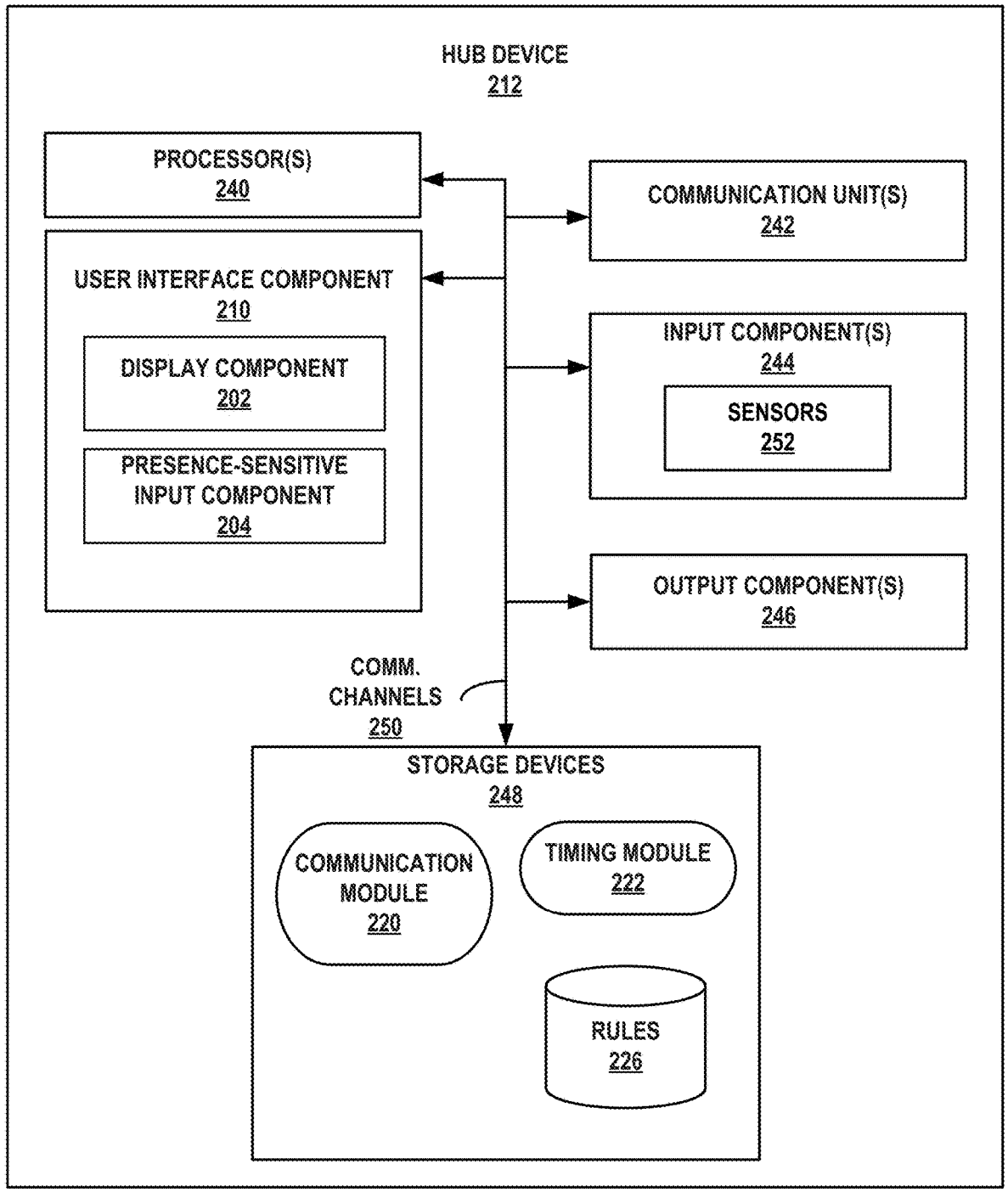
FIG. 2B is a conceptual block diagram illustrating a hub device in greater detail, in accordance with some examples of this disclosure.

FIG. 2B is a block diagram illustrating additional exemplary details of the hub device, in accordance with one or more aspects of the techniques described in this disclosure. Hub device 212 of FIG. 2B is described here as an example of hub device 12 referenced with respect to FIGS. 1 and 2A. FIG. 2B illustrates only one particular example of hub device 212, and many other examples of hub device 212 may be used in other instances and may include a subset of the components included in example hub device 212 or may include additional components not shown in FIG. 2B.

Hub device 212 may be any computer with the processing power required to adequately execute the techniques described herein. As shown in the example of FIG. 2B, hub device 212 includes user interface component (UIC) 210, one or more processors 240, one or more communication units 242, one or more input components 244, one or more output components 246, and one or more storage components 248. UIC 210 includes display component 202 and presence-sensitive input component 204. Storage components 248 of hub device 212 include communication module 220, timing module 222, and rules data store 226.

For example, one or more processors 240 may implement functionality and/or execute instructions associated with hub device 212 to detect signal interference and determine whether communication module 220 and timing module 222 need to time-shift future superframes to avoid interference. That is, processors 240 may implement functionality and/or execute instructions associated with hub device 212 to output superframes in a way that optimizes efficiency and reduces lost signals for sensor devices in communication with hub device 212.

Examples of processors 240 include application processors, display controllers, auxiliary processors, one or more sensor hubs, and any other hardware configure to function as a processor, a processing unit, or a processing device. Modules 220 and 222 may be operable by processors 240 to perform various actions, operations, or functions of hub device 212. For example, processors 240 of hub device 212 may retrieve and execute instructions stored by storage components 248 that cause processors 240 to perform the operations described with respect to modules 220 and 222. The instructions, when executed by processors 240, may cause hub device 212 to detect signal interference and determine a need to time-shift future superframes to avoid interference.

Communication module 220 may execute locally (e.g., at processors 240) to provide functions associated with communicating, using communication units 242, with various sensor devices. In some examples, communication module 220 may act as an interface to a remote service accessible to hub device 212. For example, UI module 220 may be an interface or application programming interface (API) to a remote server that facilitates communication with the various sensor devices.

In some examples, timing module 222 may execute locally (e.g., at processors 240) to provide functions associated with detecting signal interference and initiating a time-shifting sequence. In some examples, timing module 222 may act as an interface to a remote service accessible to hub device 212. For example, timing module 222 may be an interface or application programming interface (API) to a remote server that detects whether a sensor device is experiencing signal interference and initiates the time-shifting sequence.

One or more storage components 248 within hub device 212 may store information for processing during operation of hub device 212 (e.g., hub device 212 may store data accessed by modules 220 and 222 and rules data store 226 during execution at hub device 212). In some examples, storage component 248 is a temporary memory, meaning that a primary purpose of storage component 248 may not be long-term storage. Storage components 248 on hub device 212 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220 and 222 and rules data store 226. Storage components 248 may include a memory configured to store data or other information associated with modules 220 and 222 and rules data store 226.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of hub device 212 may communicate with external devices via one or more wired and/or wireless networks by transmitting and/or receiving network signals on one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of hub device 212 may receive input. Examples of input are tactile, audio, and video input. Input components 244 of hub device 212, in one example, includes a presence-sensitive input device (e.g., a touch sensitive screen, a PSD), mouse, keyboard, voice responsive system, camera, microphone or any other type of device for detecting input from a human or machine. In some examples, input components 244 may include one or more sensor components (e.g., sensors 252), including both internal sensors and connections to external sensors. Sensors 252 may include one or more biometric sensors (e.g., fingerprint sensors, retina scanners, vocal input sensors/microphones, facial recognition sensors, cameras), one or more location sensors (e.g., GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, motion sensor, passive infrared (PIR) sensor, air temperature and/or humidity sensor, air quality (e.g., carbon monoxide or particulate matter) sensor, a door or window contact sensor, or a step counter sensor.

One or more output components 246 of hub device 212 may generate output in a selected modality. Examples of modalities may include a tactile notification, audible notification, visual notification, machine generated voice notification, or other modalities. Output components 246 of hub device 212, in one example, includes a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality.

UIC 210 of hub device 212 may include display component 202 and presence-sensitive input component 204. Display component 202 may be a screen, such as any of the displays or systems described with respect to output components 246, at which information (e.g., a visual indication) is displayed by UIC 210 while presence-sensitive input component 204 may detect an object at and/or near display component 202.

While illustrated as an internal component of hub device 212, UIC 210 may also represent an external component that shares a data path with hub device 212 for transmitting and/or receiving input and output. For instance, in one example, UIC 210 represents a built-in component of hub device 212 located within and physically connected to the external packaging of hub device 212 (e.g., a screen on a mobile phone). In another example, UIC 210 represents an external component of hub device 212 located outside and physically separated from the packaging or housing of hub device 212 (e.g., a monitor, a projector, etc. that shares a wired and/or wireless data path with hub device 212).

UIC 210 of hub device 212 may detect two-dimensional and/or three-dimensional gestures as input from a user of hub device 212. For instance, a sensor of UIC 210 may detect a user's movement (e.g., moving a hand, an arm, a pen, a stylus, a tactile object, etc.) within a threshold distance of the sensor of UIC 210. UIC 210 may determine a two or three-dimensional vector representation of the movement and correlate the vector representation to a gesture input (e.g., a hand-wave, a pinch, a clap, a pen stroke, etc.) that has multiple dimensions. In other words, UIC 210 can detect a multi-dimension gesture without requiring the user to gesture at or near a screen or surface at which UIC 210 outputs information for display. Instead, UIC 210 can detect a multi-dimensional gesture performed at or near a sensor which may or may not be located near the screen or surface at which UIC 210 outputs information for display.

In accordance with one or more techniques of this disclosure, communication module 220 may receive the signal from a sensor device (e.g., directly or indirectly via a repeater module, such as at the keypad device). Timing module 222 may determine, using the signal from the sensor device, whether the sensor device is experiencing signal interference (e.g., the sensor device is not receiving superframes output by communication module 220 due to signal interference on the network). In determining whether the sensor device is experiencing signal interference, in some instances, timing module 222 may determine if the signal received from the sensor device matches a predefined signal interference criteria stored in rules data store 226. In some examples, the predefined signal interference criteria includes a non-TDMA type signal. In another example, the predefined signal interference criteria includes a retry signal. In still other examples, the predefined signal interference criteria includes a predefined number of retry signals received from the sensor device. In some instances, the predefined signal interference criteria may include two or more of the above examples of predefined signal interference criteria.

In response to determining that the device is not experiencing signal interference, communication module 220 may output a superframe including a first beacon at a first time, with the first beacon indicating a starting of the superframe. Conversely, in response to determining that the device is experiencing signal interference, communication module 220 may output a time-shifted superframe including a second beacon at a second time that is different than the first time, with the second beacon indicating a starting of the time-shifted superframe. In some examples, communication module 220 may use a same channel number to output each of the superframe and the time-shifted superframe, regardless of which of the superframe or the time-shifted superframe is ultimately output by communication module 220. Similarly, in some examples, while the first beacon may further indicate a group number assigned to the sensor device, the second beacon may also further indicate a group number assigned to the sensor device.

Figure 3:
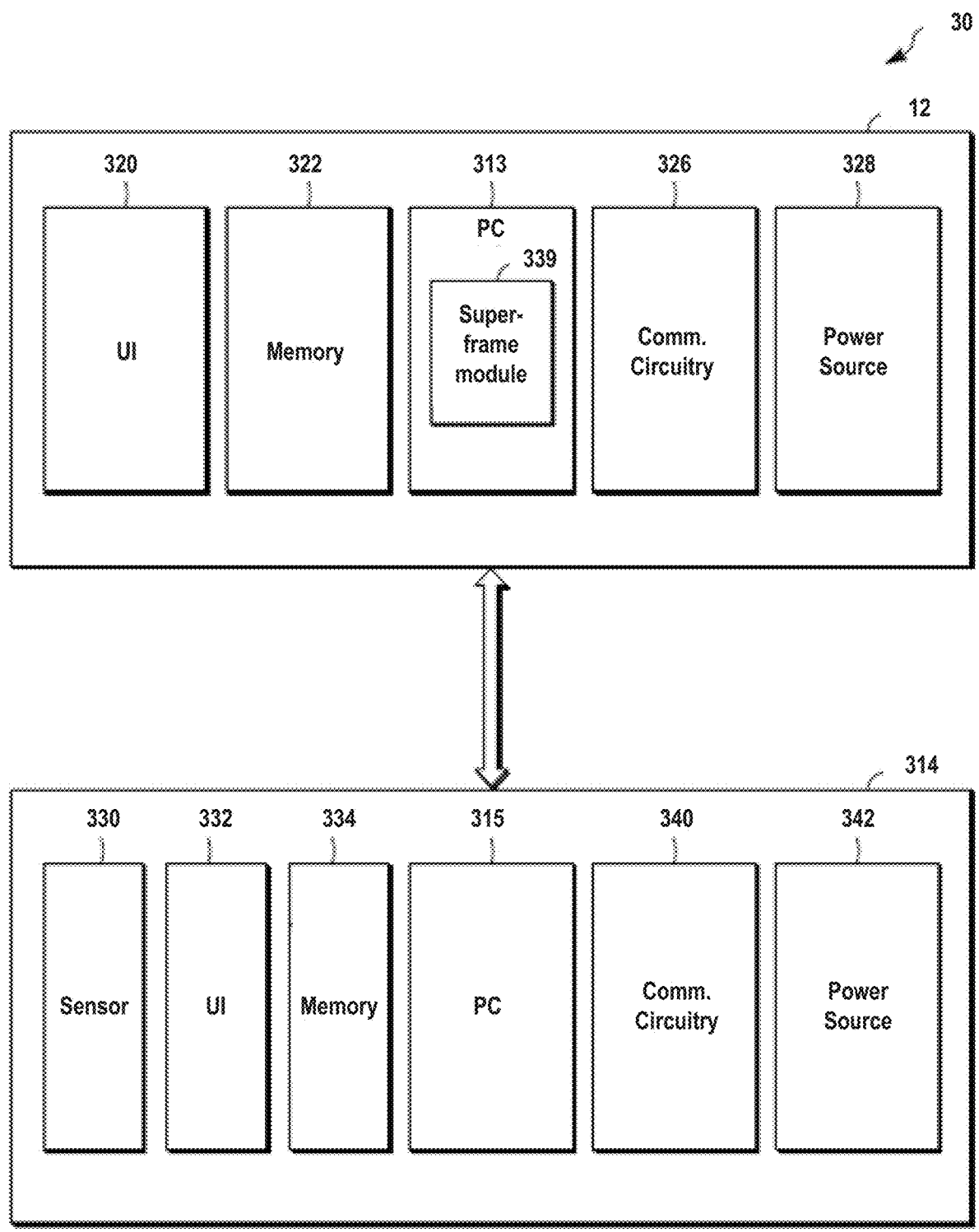
FIG. 3 is a conceptual block diagram of a hub device and a sensor device, in accordance with some examples of this disclosure.

FIG. 3 is a conceptual block diagram of the hub device 12 and the sensor device 14, in accordance with some examples of this disclosure. System 30 may be an example of any of the previous systems 10, 20, or another system. System 30 includes hub device 12 and sensor device 14. The example shown in FIG. 3 can be an illustration of direct communication between hub device 12 and sensor device 14, for instance when keypad device is in the keypad mode and not in the repeater mode.

Hub device 12 may include at least a user interface (UI) 320, a memory 322, processing circuitry (PC) 313, communication circuitry 326 ("COMM. CIRCUITRY"), and a power source 328. UI 320 is configured to receive data input from, or output data to, a user. For example, UI 320 may include a display screen, such as a touchscreen, keyboard, buttons, microphone, speaker, camera, or any other user input/output device. Other examples of UI 320 are possible. For example, during an initial setup process, hub device 12 may "scan" a local proximity in order to identify one or more other devices (e.g., devices having recognizable wireless communication capabilities, such as an ability to communicate wirelessly at a second, different frequency band), and then output for display on a display screen a list of the discovered devices for selection by a user. Via UI 320, a user may also specify one or more parameters in order to control or otherwise manage a comfort and/or security system within a building and the surrounding premises. For example, via UI 320, a user may specify one or more air temperature settings or security settings, such as access codes and/or authorized users.

Hub device 12 includes a memory 322 configured to store data, as well as instructions that, when executed by processing circuitry 313, cause hub device 12 to perform one or more techniques in accordance with this disclosure. Communication circuitry 326 may include components, such as an antenna, configured to wirelessly transmit and receive data according to one or more wireless communication protocols. For example, communication circuitry 326 may be configured to transmit and/or receive data according to the IEEE 802.15.4 protocol, Wi-Fi™, and/or the BLUETOOTH protocol where appropriate, according to one or more constraints of the respective data communication protocols (e.g., communication range, energy requirements, etc.). As an additional example, communication circuitry 326 may be configured to transmit and/or receive data using each of a first frequency band and a second, different frequency band.

Power source 328 may include a wired connection to an electric power grid, due to the energy-intensive operations performed by hub device 12. However, in some examples, power source 328 may additionally or alternatively include an internal power source, such as a battery or supercapacitor. In the example of FIG. 3, hub device 12 omits a sensor, however, in some examples, hub device 12 may further include one or more sensors. Additionally, hub device 12 may be configured as a repeater node.

Sensor device 14 may be configured to wirelessly communicate with hub device 12 (e.g., directly or indirectly, for instance depending on whether keypad device is in the keypad mode or repeater mode, respectively). Sensor device 14 may include an incorporated sensor 330, a UI 332, a memory 334, processing circuitry (PC) 315, communication circuitry 340, and a power source 342. In some examples, sensor device 14 may include an incorporated sensor device, such as a motion sensor; passive infrared (PIR) sensor; air temperature and/or humidity sensor; air quality (e.g., carbon monoxide or particulate matter) sensor; or a door or window contact sensor, as non-limiting examples. Processing circuitry 313 may include wireless protocol selection module 339 that may be configured to select a first wireless protocol or a second wireless protocol for establishing a wireless connection. In some examples, wireless protocol selection module 339 may be configured to select between three or more wireless protocols for establishing a wireless connection. In addition or alternatively, processing circuitry 313 may include a frequency band selection module that may be configured to select first and second different frequency bands to be used for wireless communication.

UI 330 is configured to receive data input from, or output data to, a user. For example, UI 330 may include a display screen, such as a touchscreen, keyboard, buttons, microphone, speaker, camera, or any other user input/output device. Other examples of UI 330 are possible. For example, during an initial setup process, sensor device 14 may "scan" a local proximity in order to identify one or more hub devices and/or other devices (e.g., devices having recognizable wireless communication capabilities, such as keypad device having the repeater mode), and then output for display on a display screen a list of discovered devices for selection by a user. Via UI 330, a user may also specify one or more parameters in order to control or otherwise manage a comfort and/or security system within a building and the surrounding premises. For example, via UI 330, a user may specify one or more air temperature settings (e.g., for a thermostat) or security settings, such as access codes and/or authorized users. Sensor device 14 includes a memory 334 configured to store data, as well as instructions that, when executed by processing circuitry 315, cause sensor device 14 to perform one or more techniques in accordance with this disclosure.

Processing circuitry 315 and hub device 12 may exchange network parameters for pairing a BLUETOOTH channel, or, in the case of indirect communication via the keypad device in the repeater mode, exchange such network parameters with the keypad device and/or hub device 12 via keypad device. For example, processing circuitry 315 may determine (e.g., receive from hub device 12 or generate for output to hub device 12), one or more of: (1) a media access control (MAC) address of host device 22 and a MAC address of thermostat 24A; (2) a real time-point in time for the transfer to start (or offset from 802.15.4 start command); (3) an indication of a starting frequency; (4) an indication of a hop set; (5) a connection interval; or (6) a connection latency.

For example, processing circuitry 315 and hub device 12 may exchange a MAC address for device 12 and a MAC address for sensor device 14. In this example, communication circuitry 326 and communication circuitry 340 may be configured to establish a BLUETOOTH channel between the MAC address for hub device 12 and the MAC address for sensor device 14.

In some examples, processing circuitry 315 and hub device 12 may exchange an indication of a particular time to establish the BLUETOOTH channel. In this example, communication circuitry 326 and communication circuitry 340 may be configured to establish the BLUETOOTH channel between hub device 12 and sensor device 14 at the particular time.

For example, processing circuitry 315 and hub device 12 may exchange an indication of a starting frequency to establish the BLUETOOTH channel. In this example, communication circuitry 326 and communication circuitry 340 may be configured to establish a BLUETOOTH channel between hub device 12 and sensor device 14 at the starting frequency. For instance, the BLUETOOTH channel between hub device 12 and sensor device 14 may include 40 1 MHz wide channels that are separated by 21 MHz. In this example, the starting frequency may be an indication of a particular 1 MHz wide channel (e.g., channel 0, 1, . . . 39) and communication circuitry 326 and communication circuitry 340 may be configured to establish a BLUETOOTH channel between hub device 12 and sensor device 14 at the particular 1 MHz wide channel. The various frequencies of BLUETOOTH channels of BLUETOOTH channels, while slightly different from each other, may all correspond to a frequency for a superframe (e.g., 2.4 GHz). The processing circuitry 315 and hub device 12 may exchange an indication of a particular frequency band (e.g., the first frequency band or the second, different frequency band) to be used for wireless communications therebetween.

Processing circuitry 315 and hub device 12 may exchange an indication of a hop set for the BLUETOOTH channel, the hop set indicating a sequence of frequencies. In this example, communication circuitry 326 and communication circuitry 340 may be configured to establish a BLUETOOTH channel between hub device 12 and sensor device 14 to operate at the sequence of frequencies. For instance, the BLUETOOTH channel between hub device 12 and sensor device 14 may include 40 1 MHz wide channels that are separated by 2 MHz. In this example, the sequence of frequencies may be an indication of an order for switching between the 1 MHz wide channels (e.g., channel 0, 1, . . . 39) and communication circuitry 326 and communication circuitry 340 may be configured to establish a BLUETOOTH channel between hub device 12 and sensor device 14 that selects a 1 MHz wide channel according to the order for switching between the 1 MHz wide channels.

In some examples, processing circuitry 315 and hub device 12 may exchange an indication of a connection interval for the BLUETOOTH channel. In this example, communication circuitry 326 and communication circuitry 340 may be configured to establish a BLUETOOTH channel between hub device 12 and sensor device 14 to operate at the connection interval. For instance, rather than exchanging data at any time on the BLUETOOTH channel between hub device 12 and sensor device 14, the BLUETOOTH channel between hub device 12 and sensor device 14 may be configured to initiate a transfer of data on BLUETOOTH channel between hub device 12 and sensor device 14 at the connection interval.

Processing circuitry 315 and hub device 12 may exchange an indication of a connection latency for the BLUETOOTH channel. In this example, communication circuitry 326 and communication circuitry 340 may be configured to establish a BLUETOOTH channel between hub device 12 and sensor device 14 to operate at the connection latency. For instance, rather than exchanging data at any time or at a connection interval on the BLUETOOTH channel between hub device 12 and sensor device 14, the BLUETOOTH channel between hub device 12 and sensor device 14 may be configured to initiate a transfer of data on BLUETOOTH channel between hub device 12 and sensor device 14 at a latency interval of sensor device 14 or hub device 12. This latency interval may be selected to reduce a time a radio of sensor device 14 and/or hub device 12 listens for data (further from a connection interval), which may reduce a power consumption of sensor device 14 and/or hub device 12 compared to systems that omit a latency interval or use a zero latency interval.

Processing circuitry 315 and hub device 12 may exchange an indication of antenna information for a plurality of antennas at sensor device 14. In this example, communication circuitry 326 and communication circuitry 340 may be configured to select a particular antenna from the plurality of antennas based on the antenna information and to establish a BLUETOOTH channel between hub device 12 and sensor device 14 using the particular antenna.

Hub device 12 and sensor device 14 may be configured to operate using a superframe, for instance in both direct communication and indirect communication via the keypad device in the repeater mode. For example, sensor device 14 may output an enrollment signal to hub device 12, which in some cases can include an indication of a frequency band at which the sensor device 14 desires to communicate with the hub device 12. Hub device 12 may assign sensor device 14 a group number and output an indication of the group number to sensor device 14. Hub device 12 may then control a timing of communications using the superframe. For example, hub device 12 may specify a start of a superframe using a beacon and identify devices that may communicate by specifying a group assigned to the superframe. In this way, sensor device 14 may determine when to output data. For example, sensor device 14 may, in response to a beacon output by hub device 12 indicating the group number assigned to sensor device 14, output data in accordance with the superframe.

Processing circuitry 315 and/or communication circuitry 340 may output a signal. Communication circuitry 326 may receive the signal from sensor device 314. Superframe module 339 may determine, using the signal from sensor device 314, whether sensor device 314 is experiencing signal interference (e.g., sensor device 314 is not receiving superframes output by superframe module 339 due to signal interference on the network). In determining whether sensor device 314 is experiencing signal interference, in some instances, superframe module 339 may determine if the signal received from sensor device 314 matches a predefined signal interference criteria.

In response to determining that the device is not experiencing signal interference, superframe module 339 may output a superframe including a first beacon at a first time, with the first beacon indicating a starting of the superframe. Conversely, in response to determining that the device is experiencing signal interference, superframe module 339 may output a time-shifted superframe including a second beacon at a second time that is different than the first time, with the second beacon indicating a starting of the time-shifted superframe. In some examples, superframe module 339 may use a same channel number to output each of the superframe and the time-shifted superframe, regardless of which of the superframe or the time-shifted superframe is ultimately output by superframe module 339. Similarly, in some examples, while the first beacon may further indicate a group number assigned to sensor device 314, the second beacon may also further indicate a group number assigned to sensor device 314.

Figure 4:
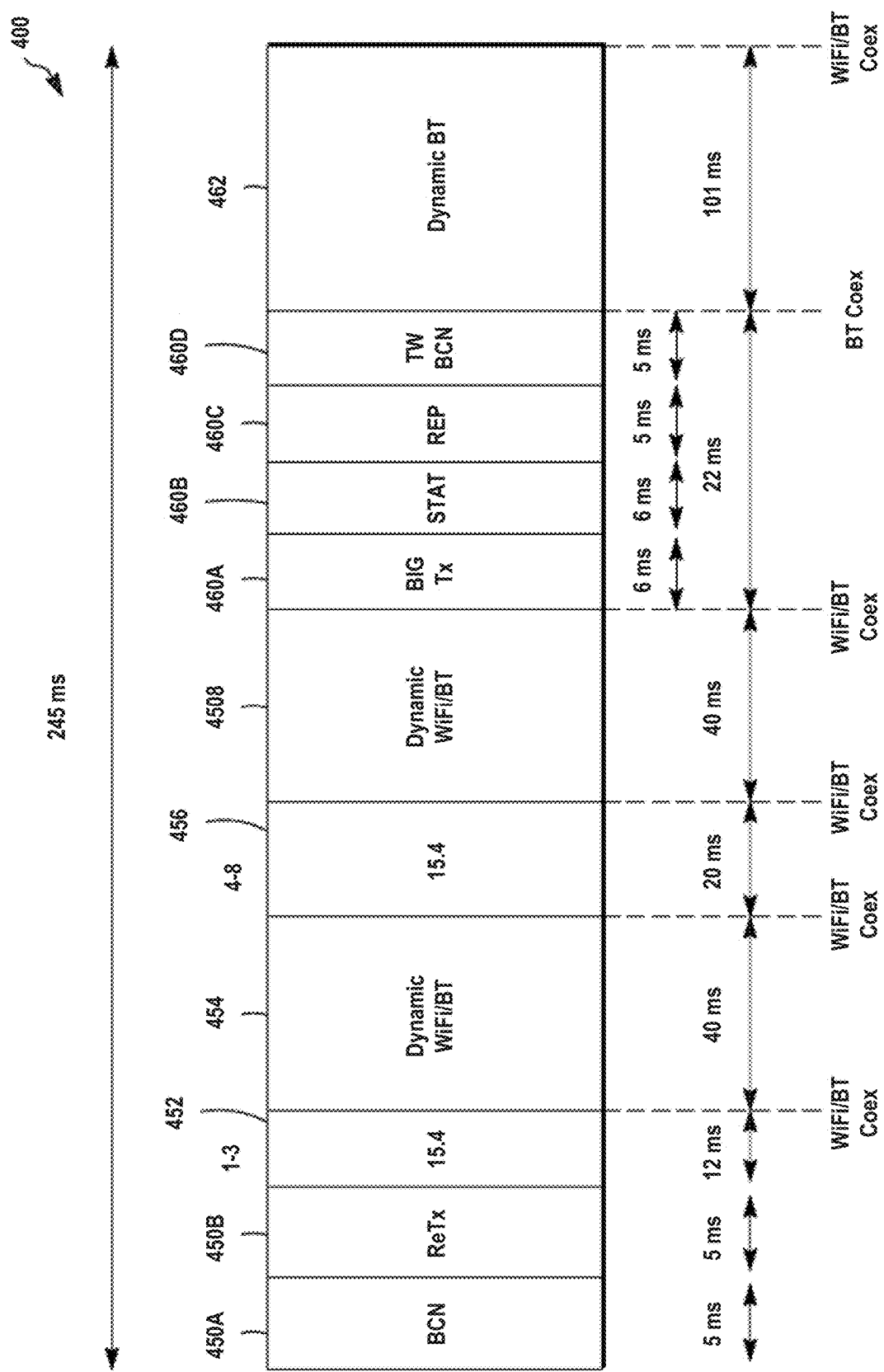
FIG. 4 is a conceptual block diagram of exemplary slots of a superframe, in accordance with some examples of this disclosure.

FIG. 4 is a conceptual block diagram of a first example of slots for a superframe, for instance a regularly scheduled superframe or a time-shifted superframe, in accordance with some examples of this disclosure. Thus, the superframe 400 can be descriptive of either type of superframe (the initial superframe or the time-shifted superframe). This is because hub device 12 does not necessarily change the contents of the superframe when time-shifting the superframe, nor does hub device 12 necessarily change the channel or manner of transmission for superframe 400. Rather, in various embodiments, hub device 12 can merely change the timing at which it outputs superframe 400.

The superframe 400 can include the slots as allocated to communications using a first frequency band. As shown, the superframe 400 may include a beacon slot 450A ("BCN 450A") and a retransmission slot 450B ("ReTx"), which may be collectively referred to here as beacon slot 450A. The order of slots shown in FIG. 4 is for example purposes only. Timing shown in FIG. 4 is for example purposes only. For example, the superframe 400 may be shorter than 245 ms or longer than 245 ms. The superframe 400 is illustrated for example purposes only. For example, a superframe may include different slots (e.g., one or more slots may be removed and/or one or more slots may be added) and/or may include slots of different widths (e.g., different durations) than superframe 400.

Beacon slot 450A may mark the beginning of superframe 400. Beacon slot 450A may be used by end devices (e.g., sensor devices 14 directly or indirectly via keypad device in repeater mode) to synchronize to the coordinator (e.g., hub device 12). As such, all devices in the system may synchronize to a master clock of the coordinator (e.g., hub device 12) thus forming a time synchronized networking system. Beacon slot 450A may include information that is used by the end devices to understand the system status, respond to commands, or other information, such as a frequency band at which a device (e.g., sensor device 14) will be communicating. The duration of beacon slot 450A may be 5 ms. The order of beacon slot 450A and a retransmission slot 450B shown in FIG. 4 is for example purposes only. Beacon slot A 450 may include additional or fewer slots. In some examples, the timing of beacon slot 450A may be less than 5 ms or more than 5 ms.

Retransmission slot 450B may be used for any non-enrolled (e.g., new) devices to associate with a coordinator (e.g., hub device 12) and thus become part of a personal area network (PAN), such as system 10, system 20, system 30 or another system. Once the enrollment mode is disabled, end devices of the previous superframe group may use retransmission 450B to attempt retransmission. The duration of retransmission slot 450B may be 5 ms.

15.4 slots 452 and 456 may be used for communications compliant with IEEE 802.15.4. In an example, there may be up to 2 or 4 15.4 slots in a superframe, however, other examples may use other combinations. Each slot may include sub-slots comprising a duration of, for example, 2 ms, 4 ms, 5, ms, etc. End devices (e.g., sensor devices 14) may use 15.4 slots 452 and 456 to transmit an alarm message, a status message, a Redlink™ network protocol (RNP) message, a supervision message, or other information. The total duration of each of 15.4 slot 452 and 15.4 slot 456 time segment may be, for example, 32 ms or 64 ms. The media access protocol for 15.4 slots 452 and 456 used may be TDMA. If a sensor device is not enrolled in a 15.4 slot, hub device 12 may allocated the 15.4 slots to Wi-Fi™ or BLUETOOTH.

Dynamic Wi-Fi™ BLUETOOTH slot 454 ("DYNAMIC Wi-Fi™/BT 454") and dynamic Wi-Fi™ BLUETOOTH slot 458 ("DYNAMIC Wi-Fi™/BT 458") may be referred to herein as a Wi-Fi™ coexistence time segments. A Wi-Fi™ time segment may be used by a Wi-Fi™ module populated on a thermostat device to transmit different types of network packets. Dynamic Wi-Fi™ BLUETOOTH slot 454, 458 may include alarm messages from the thermostat device to the central monitoring station, video streaming packets from one Wi-Fi™ client (e.g., camera or video capable sensor video/image) to another (e.g., GUI based touch screen/ Cloud, etc.). The Wi-Fi™ might be operating in different modes: (a) Wi-Fi™ Client, (b) Wi-Fi™ AP, (c) Wi-Fi™-Hybrid. Wi-Fi™ slots may be dynamic, these slots may be shared to BLUETOOTH or Wi-Fi™ depending on different modes of superframes. As shown, dynamic Wi-Fi™ BLUETOOTH slot 454 and dynamic Wi-Fi™ BLUETOOTH slot 458 may be 40 ms.

Big TX/RX Slot 460A ("Big Tx 460A"), status slot 460B, repeater slot 460C ("REP 460C"), and twin beacon slot 460D ("TW BCN 460D") may be collectively referred to herein as beacon slot B 460. The order of Big TX/RX Slot 460A, status slot 460B, repeater slot 460C, and twin beacon slot 460D shown in FIG. 4 is for example purposes only. Beacon slot B 460 may include additional or fewer slots.

Big TX/RX Slot 460A may include one or more large data transmit slots that are each more than 10 bytes and may be up to 96 bytes. An access point (e.g., hub device 12) may be able to send any data to any device using this slot. Data can be unicast, broadcast or groupcast depending on a type of request. This mode of communication may be indicated in beacon A slot 450. Big TX/RX Slot 460A may be used to send over-network download (OND) blocks to sensor devices or to set configure sensor devices. If the TX/RX Slot 460A is not active, hub device 12 may allocate time for TX/RX Slot 460A to Wi-Fi™ to increase time for Wi-Fi™ communication.

Status slot 450B may share a status with some or all of sensor devices 14. Status slot 450B may not be active at every instance of a superframe. Status slot 450B may include data that is unicast, broadcast, or groupcast depending on a type of request. This mode of communication may be indicated in beacon A slot 450.

Repeater slot 460C may be configured for sending and receiving data from repeaters of a large/small data. An access point (e.g., hub device 12) may be able to send any data to any repeater using repeater slot 460C. Data included in repeater slot 460C can be unicast, broadcast or groupcast depending on a type of request. This mode of communication may be indicated in beacon A slot 450.

Twin beacon slot 460D may be called information beacon/twin beacon. Payload of twin beacon 460D may be almost same as beacon slot 450A with some exceptions but may operate in a different channel referred to herein as an information channel. Twin beacon slot 460D may be present in all superframes irrespective of modes of operation. Twin beacon slot 460D may be used by all the end devices to synchronize to the coordinator only if they lose connection with an access point using beacon slot 450A. Twin beacon slot 460D may not be used for synchronization of time but may be used to share the information like what is the operation channel or frequency hopping sequence or a next channel of communication. The duration of twin beacon slot 460D may be 5 ms. In some examples, the timing of twin beacon slot 460D may be less than 5 ms or more than 5 ms.

Dynamic BLUETOOTH slot 462 may be dedicated to BLUETOOTH by an access Point (e.g., hub device 12). Dynamic BLUETOOTH slot 462 may support mobile and sensor communication. Allocation of dynamic BLUETOOTH slot 462 may vary with different modes of comfort/security superframes as described further below. As shown, dynamic BLUETOOTH slot 462 may be 101 ms. In some examples, the timing of dynamic BLUETOOTH slot 462 may be less than 101 ms or more than 101 ms.

Figure 5:
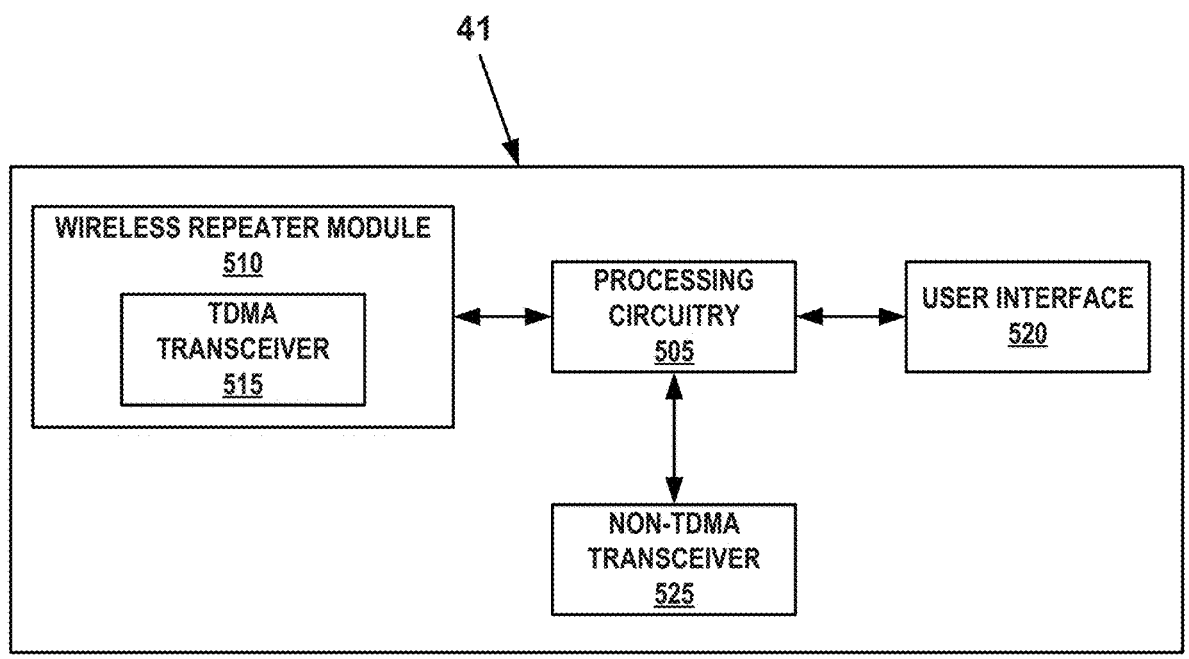
FIG. 5 is a conceptual block diagram of a keypad device, in accordance with some examples of this disclosure.

FIG. 5 is a conceptual block diagram of keypad device 41, in accordance with some examples of this disclosure. As described and illustrated elsewhere herein, the keypad device 41 can be part of a premise network that includes hub device 12 and one or more sensor devices 14. As noted previously, the keypad device 41 can be configured to operate in the keypad mode and the wireless repeater mode. In the keypad mode, the keypad device 41 can be in communication with the hub device 12 but not in direct communication with one or more particular sensor devices 14. In the repeater mode, the keypad device 41 can be in communication with hub device 12 and in direct communication with the one or more particular sensor devices 14 which the keypad device 41 is not in direct communication with when in the keypad mode such that the keypad device 41, in the repeater mode, acts as a repeater between the hub device 12 and the one or more particular sensor devices 14. Thus, when the keypad device 41 is in the repeater mode, hub device 12 can be in indirect wireless communication (e.g., communication via activated wireless repeater module 510 at the keypad device 41) with the one or more particular sensor devices 14.

As shown in the illustrated example here, keypad device 41 can include processing circuitry 505, wireless repeater module 510, and a user interface 520. The user interface 520 can be configured to display status information received from the hub device 12. As one such example, the user interface 520 can be configured to receive a user-provided wireless repeater mode input, and the keypad device 41 can be configured to operate in the wireless repeater mode in response to receiving the user-provided wireless repeater mode input at the user interface 520. In some examples, the user interface 520 at the keypad device 41 can include a display component for presenting one or more data points and an input component, such as a touchscreen and/or alphanumeric characters, for providing user input at the keypad device 41.

In some embodiments, the keypad device 41 can include a backup power source. For example, the keypad device 41 can include a wired power input configured to receive mains power (e.g., from a mains power output at a wall surface) and also include a power storage component (e.g., a battery), for instance, that is configured to provide power to the keypad device 41 when the mains power is unavailable to the keypad device 41. In other words, the keypad device 41 can be configured to use the wired power input as a primary power source for operation of the keypad device 41 and configured to use the power storage component as a secondary power source for operation at times when the wired power input is lacking. With this backup power source configuration, when the keypad device 41 is in the wireless repeater mode, the keypad device 41 can be suited for conveying life safety type messages. To further bolster the life safety messaging capability of the keypad device 41, the keypad device 41 can include multiple wireless transceivers, as described further below, so as to enable backup communication in the event of power loss. For example, one of these multiple wireless transceivers can be a cellular radio wireless transceiver that is capable of transmitting data communications from the keypad device 41 in the event of power loss at the premise.

As also shown in this illustrated example of FIG. 5, keypad device 41 can additionally include one or more transceivers, such as a TDMA transceiver 515 and a non-TDMA transceiver 525. In one example, the TDMA transceiver 515 can be part of the wireless repeater module 510. In another example, the non-TDMA transceiver 525 can be part of the wireless repeater module 510. In a further example, both the TDMA transceiver 515 and the non-TDMA transceiver 525 can be part of the wireless repeater module 510. Processing circuitry 505 can be coupled to user interface 520, for example, to receive user input provided via user interface 520 and to process such user input to take one or more actions corresponding to the received user input. Likewise, processing circuitry 505 can be coupled to the wireless repeater module 510 and each of the one or more transceivers, in the illustrated embodiment coupled to each of the TDMA transceiver 515 and non-TDMA transceiver 525, so as to receive data communications at the keypad device 41 and transmit data communications from the keypad device 41.

Processing circuitry 505 can be configured to communicate with the hub device 12 and, in various examples depending on the mode in which the keypad device is selectively set to operation, communicate with one or more sensor devices 14 using one or more wireless communication protocols. For example, processing circuitry 505 can be configured to use TDMA for communication in system 20, for instance, in a manner as described previously for processing circuitry 15 of hub device 12.

Processing circuitry 505 can be configured to selectively operate keypad device 41 in the keypad mode and in the wireless repeater mode. For example, processing circuitry 505 can be configured to operate the keypad device 41 in the keypad mode in which, for instance, the keypad device 41 is in communication with the hub device 12 but not in direct communication with a remote sensor device 14. And, processing circuitry 505 can be configured to operate the keypad device 41 in the wireless repeater mode in which, for instance, the keypad device 41 is in communication with the hub device 12 and in direct communication with the remote sensor device 14 such that the keypad device 41, when operated in the wireless repeater mode, acts as a wireless repeater between the hub device 12 and the remote sensor device 14. In some embodiments, the when operated in the wireless repeater mode, the keypad device 41 can directly communicate with the hub device 12 and/or remote sensor device 14 using TDMA.

In some examples, processing circuitry 505 can be configured to operate the keypad device 41 in only of the keypad mode and the wireless repeater mode at a given time. In such examples, the keypad device 41 can be selectively operated in either the keypad mode or the wireless repeater mode at a given time.

The keypad device 41 can receive user input via the user interface 520 specifying either a keypad mode or a wireless repeater mode for operation of the keypad device 41. Upon receiving user input specifying one of the keypad mode and wireless repeater mode for operation, the keypad device 41 can transition from the other of the keypad mode and wireless repeater mode for subsequent operation of the keypad device 41. For instance, processing circuitry 505 can be configured to operate the keypad device 41 in the wireless repeater mode in response to the keypad device 41 receiving a user-provided wireless repeater mode input at the user interface 520 of the keypad device 41. As one such example, the hub device 12 can be configured to receive the user-provided wireless repeater mode input, and the hub device 12 can be configured, in response to receiving the user-provided wireless repeater mode input, to transmit a wireless repeater mode command signal to the keypad device 41. The keypad device 41 can be configured, in response to receiving the wireless repeater mode command signal, to transition from the keypad mode to the wireless repeater mode. In other words, the user-provided wireless repeater mode input can be received at the keypad device 41 from the hub device 12 and processing circuitry 505 can be configured to operate the keypad device 41 in the wireless repeater mode in response to the keypad device 41 receiving a user-provided wireless repeater mode input from the hub device 12. In this example, processing circuitry 505 can be configured to transition the keypad device 41 from operation in the keypad mode to operation in the wireless repeater mode in response to the keypad device receiving the user-provided wireless repeater mode input from the hub device 12.

As noted, the keypad device 41 can include the wireless repeater module 510. The wireless repeater module 510 can be coupled to the processing circuitry 505 and can include one or more transceivers, such as the TDMA transceiver 515 and/or the non-TDMA transceiver 525. Processing circuitry 505 can be configured to operate the keypad device 41 in the wireless repeater mode via the wireless repeater module 510 by communicating with the hub device 12 via the TDMA wireless transceiver 515 using TDMA and, in some further examples, communicating directly with the remote sensor device 14 via the TDMA wireless transceiver 515 using TDMA.

Each of the one or more wireless transceivers 515, 525 at the keypad device 41 can be coupled to processing circuitry 505. When processing circuitry 505 operates the keypad device 41 in the wireless repeater mode, the keypad device 41 can be configured to communicate with the hub device 12 via the TDMA wireless transceiver 515 using TDMA. And, when processing circuitry 505 operates the keypad device 41 in the wireless repeater mode, the keypad device 41 can be configured to directly communicate with the remote sensor device 14 via the TDMA wireless transceiver 515 using TDMA. When processing circuitry 505 operates the keypad device 41 in the keypad mode, the keypad device 41 can be configured to communicate with the hub device 12 via the non-TDMA wireless transceiver 525 using a non-TDMA protocol. And, when processing circuitry 505 operates the keypad device 41 in the keypad mode, the keypad device 41 can be configured to directly communicate with the remote sensor device 14 via the non-TDMA wireless transceiver 525 using the non-TDMA protocol. As illustrative, non-limiting examples, the non-TDMA protocol can be selected from the group consisting of: a IEEE 802.11 protocol, a BLUETOOTH protocol, and a ZigBee protocol.

In one example, processing circuitry 505 can be configured to activate the TDMA wireless transceiver 515 when processing circuitry 505 operates the keypad device 41 in the wireless repeater mode and deactivate the TDMA wireless transceiver 515 when processing circuitry 505 operates the keypad device 41 in the keypad mode. Similarly, processing circuitry 505 can be configured to activate the non-TDMA wireless transceiver 525 when processing circuitry 505 operates the keypad device 41 in the wireless repeater mode and deactivate the non-TDMA wireless transceiver 525 when processing circuitry 505 operates the keypad device 41 in the keypad mode.

Figure 6:
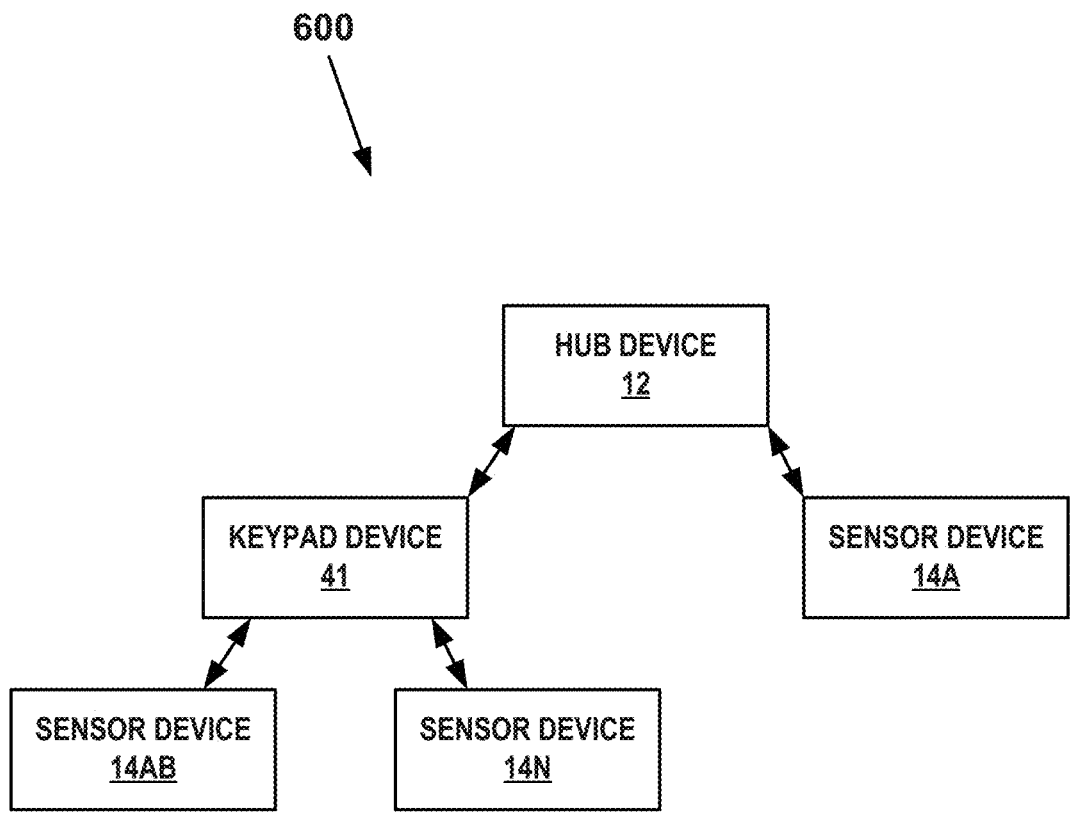
FIG. 6 is a conceptual block diagram illustrating an example of a home network with a keypad device in a repeater mode, in accordance with some examples of this disclosure.

FIG. 6 is a conceptual block diagram illustrating an example of a home network system 600 The system 600 can be included at a single premise. The system 600 includes hub device 12, keypad device 41, and sensor devices 14A, 14B, and 14N. The number of sensor devices included in the system 600, including the number of sensor devices in direct communication with the keypad device 41, can vary depending on the particular application of the system 600.

The system 600 of FIG. 6 illustrates one example where the keypad device 41 is in the wireless repeater mode, whereas the system 20 of FIG. 2A illustrates one example where the keypad device 41 is in the keypad mode. As shown in FIG. 2A, in the keypad mode, the keypad device 41 can be in communication (e.g., direct communication) with the hub device 12 but not in direct communication with certain sensor devices 14. On the other hand, as shown in FIG. 6, in the wireless repeater mode, the keypad device 41 can be in communication (e.g., direct communication) with the hub device 12 and in direct communication with sensor devices 14B, 14N such that the keypad device 41, in the wireless repeater mode, acts as a wireless repeater between the hub device 12 and sensor devices 14B, 14N. The keypad device 41 can be configured to transition between the keypad mode and the wireless repeater mode to enable (in the wireless repeater mode) or disable (in the keypad mode) direct communication between the keypad deice 41 and the sensor devices 14B, 14N.

For example, in the system 600, the hub device 12 can be in communication with the sensor devices 14A, 14B, 14N using TDMA. In particular, the hub device 12 can be in direct communication with the sensor device 14A via TDMA, and the hub device 12 can be in indirect communication with the sensor devices 14B, 14N via TDMA via the keypad device 41, in the wireless repeater mode, being in direct communication with the hub device 12, via TDMA, and in direct communication with the sensor devices 14B, 14N, via TDMA. In other examples, the keypad device 41 can be in direct communication with each of the hub device 12 and the sensor devices 14B,14N via a non-TDMA protocol, for instance, using the non-TDMA transceiver at the keypad device 41.

In some embodiments, depending on the network configuration of the system at the premise, the keypad device 41, in the wireless repeater mode, can in communication with another keypad device in the network system at the premise. For example, in such embodiments, when the keypad device 41 is in the wireless repeater mode, the keypad device 41 can be in direct communication with the another keypad device, for instance via TDMA. Thus, the another keypad device could be in the position shown in FIG. 6 for the sensor devices 14B, 14N. And, this another keypad device, which in direct communication with the keypad device 41, can itself have a selectively enabled wireless repeater mode such that this another keypad device can be configured to operate in the wireless repeater mode such that the hub device 12 is in indirect communication with the another keypad device, when in the wireless repeater mode, via the keypad device 41, when in the wireless repeater mode.

Figure 7:
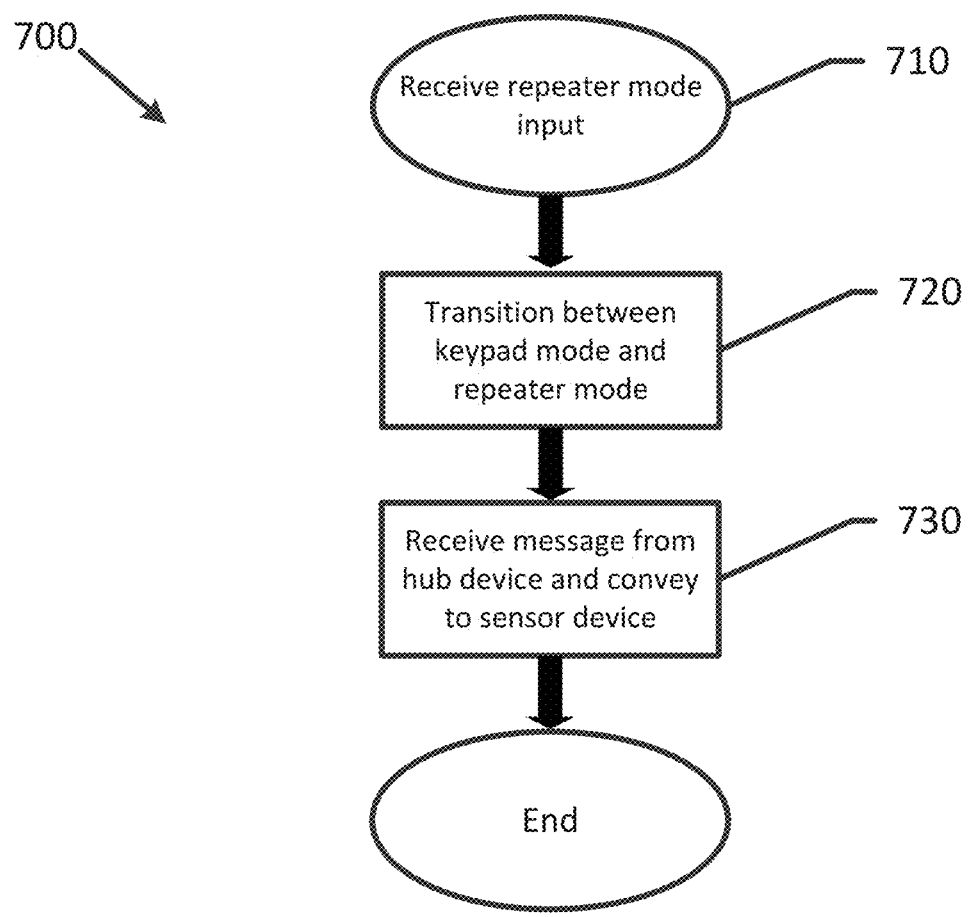
FIG. 7 is a flow diagram illustrating a method, in accordance with some examples of this disclosure.

FIG. 7 is a flow diagram of an embodiment of a method 700.

At step 710, the method 700 includes receiving a user-provided wireless repeater mode input at a keypad device. The keypad device referenced in the method 700 can be, for example, a keypad device that is similar to, or the same as, the keypad device described elsewhere herein. For instance, the keypad device referenced in the method 700 can have one or more (e.g., each) of the features describes elsewhere herein with respect to the keypad device.

At step 720, the method 700 includes transitioning the keypad device between a keypad mode, in which the keypad device is in communication with a hub device but not in direct communication with a remote sensor device, and a wireless repeater mode, in which the keypad device is in communication with the hub device and in direct communication with the remote sensor device using TDMA such that the keypad device, in the wireless repeater mode, acts as a wireless repeater between the hub device and the remote sensor device. For example, the transitioning at step 720 can occur in response to the keypad device receiving the user-provided wireless repeater mode input at step 710.

At step 730, the method 700 includes receiving, at the keypad device, a TDMA message from the hub device and conveying the TDMA message from the keypad device to the remote sensor device. For example, the reception of the TDMA message at the keypad device at step 720 can occur when the keypad device is in the wireless repeater mode.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A system comprising:
a sensor device configured to communicate with a hub device; and
a keypad device configured to communicate with the hub device,
wherein the keypad device is configured to operate in a wireless repeater mode in which the keypad device is configured to be in communication with the hub device and in direct communication with the sensor device such that the keypad device, in the wireless repeater mode, acts as a wireless repeater between the hub device and the sensor device, wherein the keypad device is configured to transition from a keypad mode to the wireless repeater mode as a result of at least a repeater mode input.

2. The system of claim 1, wherein the hub device is in communication with the sensor device using time divisional multiple access (TDMA), and wherein, when the keypad device is configured to operate in the wireless repeater mode, the keypad device is in communication with the hub device and in direct communication with the sensor device using TDMA.

3. The system of claim 1, wherein when the keypad device is configured to operate in the keypad mode the keypad device is in communication with the hub device but not in direct communication with the sensor device, and wherein the keypad device is configured to operate in only one of the keypad mode and the wireless repeater mode at a given time.

4. The system of claim 1, wherein when the keypad device is configured to operate in the keypad mode the keypad device is in communication with the hub device but not in direct communication with the sensor device, and wherein the keypad device is configured to operate in the wireless repeater mode in response to a user-provided wireless repeater mode input.

5. The system of claim 4, wherein the hub device is configured to receive the user-provided wireless repeater mode input, wherein the hub device is configured, in response to receiving the user-provided wireless repeater mode input, to transmit a wireless repeater mode command signal to the keypad device, and wherein the keypad device is configured, in response to receiving the wireless repeater mode command signal, to transition from the keypad mode to the wireless repeater mode.

6. The system of claim 1, wherein the keypad device includes a user interface, and wherein the user interface is configured to display status information received from the hub device.

7. The system of claim 6, wherein the user interface is configured to receive a user-provided wireless repeater mode input, and wherein the keypad device is configured to operate in the wireless repeater mode in response to receiving the user-provided wireless repeater mode input at the user interface.

8. The system of claim 1, wherein the keypad device comprises:
a time divisional multiple access (TDMA) wireless transceiver configured to communicate with the hub device using TDMA and directly communicate with the sensor device using TDMA; and
a non-TDMA wireless transceiver configured to communicate with the hub device using a non-TDMA protocol and directly communicate with the sensor device using the non-TDMA protocol.

9. The system of claim 8, wherein the TDMA wireless transceiver is activated when the keypad device is in the wireless repeater mode and deactivated when the keypad is in the keypad mode, and wherein the non-TDMA wireless transceiver is activated when the keypad device is in the wireless repeater mode and deactivated when the keypad is in the keypad mode.

10. A keypad device comprising:
a user interface; and
processing circuitry coupled to the user interface and configured to:
operate the keypad device in a wireless repeater mode in which the keypad device is in communication with a hub device and in direct communication with a remote sensor device such that the keypad device, when operated in the wireless repeater mode, acts as a wireless repeater between the hub device and the remote sensor device, wherein the keypad device is configured to transition from a keypad mode to the wireless repeater mode as a result of at least a repeater mode input.

11. The device of claim 10, further comprising:
a time divisional multiple access (TDMA) wireless transceiver coupled to the processing circuitry, wherein when the processing circuitry operates the keypad device in the wireless repeater mode the keypad device is configured to communicate with the hub device via the TDMA wireless transceiver using TDMA and is configured to directly communicate with the remote sensor device via the TDMA wireless transceiver using TDMA; and a non-TDMA wireless transceiver coupled to the processing circuitry, wherein when the processing circuitry operates the keypad device in the keypad mode the keypad device is configured to communicate with the hub device via the non-TDMA wireless transceiver using a non-TDMA protocol and is configured to directly communicate with the remote sensor device via the non-TDMA wireless transceiver using the non-TDMA protocol.

12. The device of claim 11, wherein the processing circuitry is configured to activate the TDMA wireless transceiver when the processing circuitry operates the keypad device in the wireless repeater mode and deactivate the TDMA wireless transceiver when the processing circuitry operates the keypad device in the keypad mode.

13. The device of claim 12, wherein the processing circuitry is configured to activate the non-TDMA wireless transceiver when the processing circuitry operates the keypad device in the wireless repeater mode and deactivate the non-TDMA wireless transceiver when the processing circuitry operates the keypad device in the keypad mode.

14. The device of claim 10, further comprising:
a battery configured to provide power to the keypad device when a mains power source for the keypad device is unavailable.

15. The device of claim 10, wherein the processing circuitry is configured to operate the keypad device in only of the keypad mode and the wireless repeater mode at a given time.

16. The device of claim 10, wherein the processing circuitry is configured to operate the keypad device in the wireless repeater mode in response to the keypad device receiving a user-provided wireless repeater mode input at the user interface of the keypad device.

17. The device of claim 10, wherein the processing circuitry is configured to operate the keypad device in the wireless repeater mode in response to the keypad device receiving a user-provided wireless repeater mode input from the hub device.

18. The device of claim 17, wherein the processing circuitry is configured to transition the keypad device from operation in the keypad mode to operation in the wireless repeater mode in response to the keypad device receiving the user-provided wireless repeater mode input from the hub device.

19. The device of claim 10, further comprising:
a wireless repeater module coupled to the processing circuitry, the wireless repeater module comprising a time divisional multiple access (TDMA) wireless transceiver, wherein the processing circuitry is configured to operate the keypad device in the wireless repeater mode via the wireless repeater module by communicating with the hub device via the TDMA wireless transceiver using TDMA and communicating directly with the remote sensor device via the TDMA wireless transceiver using TDMA.

20. A method comprising the steps of:
receiving a wireless repeater mode input at a keypad device;

in response to the keypad device receiving the wireless repeater mode input, transitioning the keypad device between a keypad mode and a wireless repeater mode, wherein when the keypad device is in the wireless repeater mode the keypad device is in communication with a hub device and in direct communication with a remote sensor device such that the keypad device, in the wireless repeater mode, acts as a wireless repeater to convey communication between the hub device and the remote sensor device; and when the keypad device is in the wireless repeater mode, receiving, at the keypad device, a message from the hub device and conveying the message from the keypad device to the remote sensor device.

* * * * *